(12) United States Patent
Smith et al.

(10) Patent No.: US 12,228,233 B2
(45) Date of Patent: *Feb. 18, 2025

(54) RESONATOR FOR A PRESSURIZED FLUID SYSTEM

(71) Applicant: Smith & Burgess Process Safety Consulting, Houston, TX (US)

(72) Inventors: Dustin Smith, Houston, TX (US); John Burgess, Cypress, TX (US)

(73) Assignee: Smith & Burgess Process Safety Consulting, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,692

(22) Filed: Oct. 4, 2023

(65) Prior Publication Data

US 2024/0027012 A1 Jan. 25, 2024

Related U.S. Application Data

(63) Continuation of application No. 16/689,323, filed on Nov. 20, 2019, now Pat. No. 11,815,198.

(Continued)

(51) Int. Cl.
*F16L 55/033* (2006.01)
*G10K 11/172* (2006.01)

(52) U.S. Cl.
CPC .......... *F16L 55/033* (2013.01); *G10K 11/172* (2013.01)

(58) Field of Classification Search
CPC .............................. G10K 11/172; F16L 55/033
See application file for complete search history.

(56) References Cited

U.S. PATENT DOCUMENTS

| 2,707,002 A | 4/1955 | Harris |
| 3,163,985 A | 1/1965 | Bouyoucos |

(Continued)

FOREIGN PATENT DOCUMENTS

| DE | 202005007714 U1 | 9/2006 |
| DE | 202011052317 U1 | 8/2012 |

(Continued)

OTHER PUBLICATIONS

International Search Report and Written Opinion dated Jan. 24, 2020 for Application No. PCT/US2019/062342.

(Continued)

*Primary Examiner* — Forrest M Phillips
(74) *Attorney, Agent, or Firm* — Patterson + Sheridan, LLP

(57) ABSTRACT

Embodiments described and discussed herein generally relate to resonators for pressurized fluid systems, pressurized fluid systems containing resonators, and methods of reducing acoustic energy within pressurized fluid systems. In one or more embodiments, a resonator includes a first chamber containing an inlet and an outlet, a second chamber containing an inlet, an outlet, and a passageway, where the inlet of the second chamber is in fluid communication with the outlet of the first chamber, a third chamber containing an inlet and an outlet, where the inlet of the third chamber is in fluid communication with the outlet of the second chamber, and where the outlet of the third chamber is configured to be in fluid communication with a pressure relief device containing a safety valve, and a fourth chamber in fluid communication with the second chamber by the passageway.

23 Claims, 12 Drawing Sheets

Related U.S. Application Data

(60) Provisional application No. 62/771,977, filed on Nov. 27, 2018.

(56) References Cited

U.S. PATENT DOCUMENTS

| | | | |
|---|---|---|---|
| 3,868,972 | A | 3/1975 | Zirps |
| 3,931,834 | A | 1/1976 | Caillet |
| 5,694,966 | A | 12/1997 | Holder |
| 5,845,621 | A | 12/1998 | Robinson et al. |
| 6,109,387 | A | 8/2000 | Boretti |
| 6,925,868 | B2 | 8/2005 | Young et al. |
| 7,730,997 | B2 | 6/2010 | Asada et al. |
| 7,789,194 | B2 | 9/2010 | Lathrop et al. |
| 7,848,475 | B2 | 12/2010 | Kaufman et al. |
| 7,905,321 | B2 | 3/2011 | Ballard, III |
| 8,393,437 | B2 | 3/2013 | Longoni et al. |
| 8,869,827 | B2 | 10/2014 | Yamauchi |
| 9,062,679 | B2 | 6/2015 | Lucas et al. |
| 9,914,103 | B1 | 3/2018 | Eidelman |
| 10,215,320 | B2 | 2/2019 | Arndt et al. |
| 11,815,198 | B2 * | 11/2023 | Smith ............ F16L 55/033 |
| 2002/0059959 | A1 | 5/2002 | Qatu et al. |
| 2004/0050618 | A1 | 3/2004 | Marocco |
| 2004/0094360 | A1 | 5/2004 | Toyoshima |
| 2004/0140149 | A1 | 7/2004 | Terpay et al. |
| 2005/0194207 | A1 | 9/2005 | Nemit et al. |
| 2006/0086563 | A1 | 4/2006 | Lucas |
| 2008/0041657 | A1 | 2/2008 | Ido et al. |
| 2008/0149201 | A1 | 6/2008 | Sommerville et al. |
| 2009/0145688 | A1 | 6/2009 | Marcoux |
| 2011/0088968 | A1 | 4/2011 | Kempf et al. |
| 2011/0139541 | A1 | 6/2011 | Schuermans et al. |
| 2012/0206011 | A1 * | 8/2012 | Longoni ........... F16L 55/02718  310/300 |
| 2014/0151148 | A1 * | 6/2014 | Pradhan ................ F01N 1/026  181/266 |
| 2015/0338012 | A1 | 11/2015 | Cogliati et al. |
| 2016/0123208 | A1 * | 5/2016 | Mah .................... F01N 1/023  181/229 |
| 2016/0201621 | A1 * | 7/2016 | Grieswald .......... F02M 35/1261  181/229 |
| 2017/0356433 | A1 * | 12/2017 | Doi ........................ F04B 39/16 |
| 2020/0166169 | A1 | 5/2020 | Smith et al. |

FOREIGN PATENT DOCUMENTS

| | | |
|---|---|---|
| DE | 102015202851 A1 | 8/2016 |
| FR | 1253748 A | 2/1961 |
| NL | 6405878 A | 11/1965 |
| WO | 2011044993 A1 | 4/2011 |
| WO | 2017004617 A1 | 1/2017 |

OTHER PUBLICATIONS

Extended European Search Report dated Jun. 20, 2022 for Application No. 19888756.4.

European Office Action dated May 10, 2023 for Application No. 19888756.4.

* cited by examiner

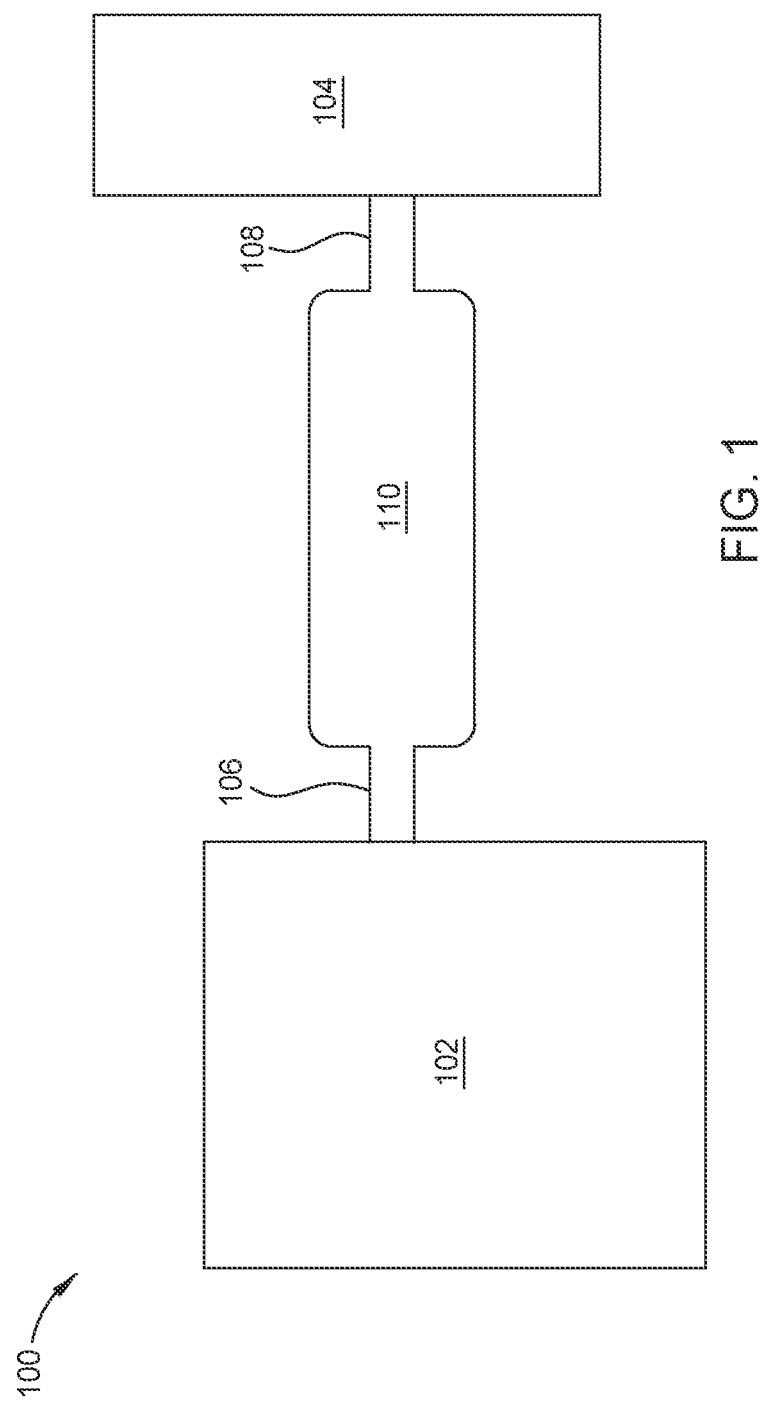

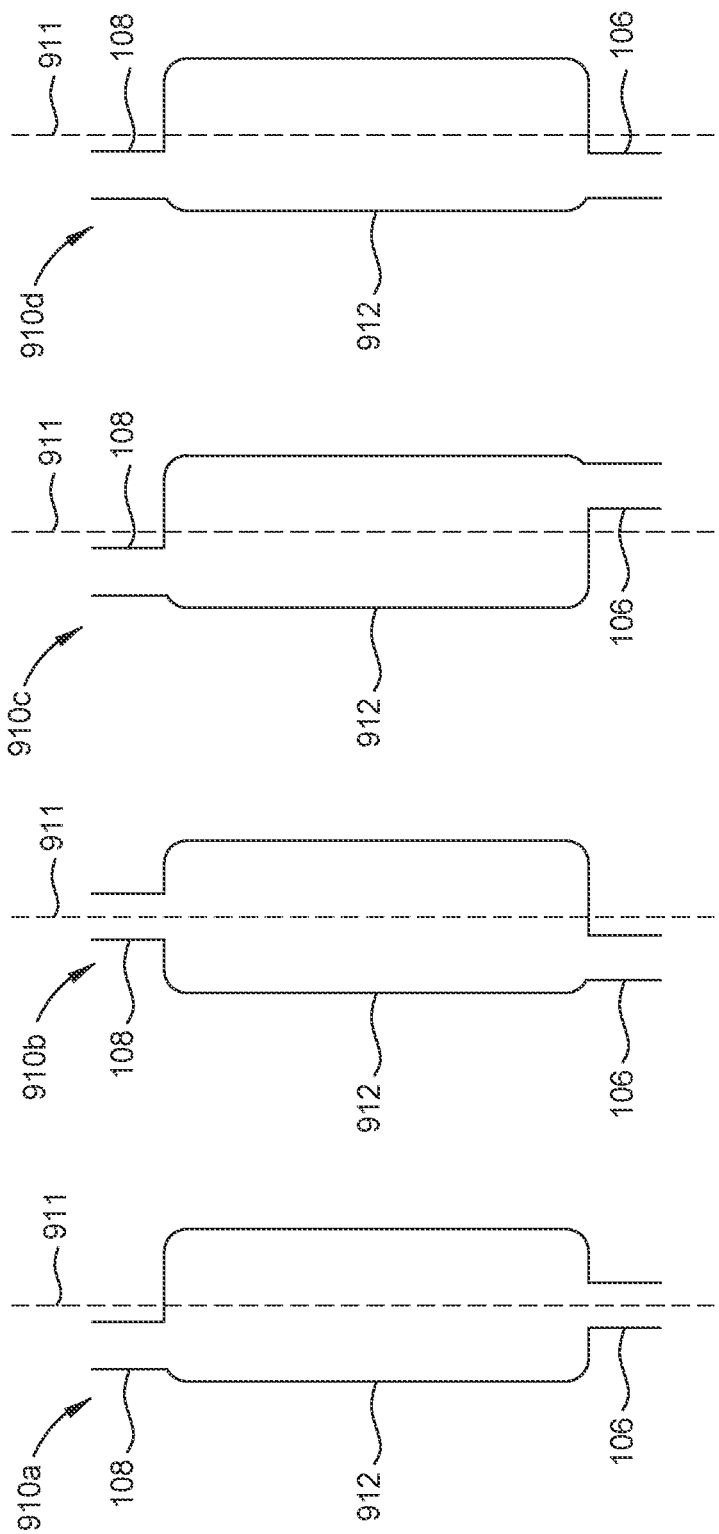

RESONATOR FOR A PRESSURIZED FLUID SYSTEM

CROSS-REFERENCE TO RELATED APPLICATIONS

This application is a continuation of U.S. application Ser. No. 16/689,323, filed on Nov. 20, 2019, which claims benefit to U.S. Prov. Appl. No. 62/771,977, filed on Nov. 27, 2018, which are herein incorporated by reference in their entirety.

BACKGROUND

Field

Embodiments described and discussed herein generally relate to pressurized fluid system, and more specifically to apparatuses and methods that reduce or alleviate oscillations caused by a pressure relief device.

Description of the Related Art

Pressurized fluid systems, including pressure vessels, piping, and other systems are often equipped with pressure relief devices to protect systems from overpressure conditions. Overpressure conditions can arise from a process error, instrument or equipment failure, fire, or other malfunctions, which causes the pressure of the fluid in the system to increase above predefined parameters. Pressure relief devices may include a variety of different types, sizes, and configurations. For example, pressure relief devices can be self-actuated in that the device detects an overpressure condition and opens to release excess pressure from the system. In some cases, pressure relief devices are set to remain closed up to a particular pressure setting. When the internal pressure of the line exceeds the pre-defined pressure setting, the pressure device can be forced open by the internal pressure, allowing excess pressure to escape the relief device. The excess pressure is released by the flow of material from the protected system, through the relief valve, and out into either a disposal system (e.g., a flare) or straight to the atmosphere. Without the release of fluid, pressure relief devices would not function.

When a pressure relief valve actuates, a combination of the valve action, inlet piping, and vessel interactions can cause the pressure relief valve to become unstable and oscillate open and closed at high frequencies (typically greater than 10 cycles per second). This rapid oscillation reduces relief valve capacity, which can cause extensive damage to equipment within the system and can lead to incidents. Furthermore, pressure vessel installation codes (e.g., ASME Boiler & Pressure Vessel Code) prohibit the installation of pressure relief devices such that the devices may operate unstably. Other codes (e.g., API STD 520) have rules that require pressure relief devices to be installed with both short inlet lines and in a way that are free draining to flare headers. Facilities often have pressure relief devices that are installed at a relatively far distance from the vessels, flagged as potentially unstable, and require mitigation.

Therefore, there is a need for apparatuses and methods that reduce or alleviate rapid oscillation caused by a pressure relief device.

SUMMARY

Implementations described herein generally relate to resonators for pressurized fluid systems, pressurized fluid systems containing resonators, and methods for reducing acoustic energy from a pressure relief device.

In one or more embodiments, a resonator for a pressurized fluid system includes a first chamber containing an inlet and an outlet and a second chamber containing an inlet, an outlet, and a filter port, where the inlet of the second chamber is in fluid communication with the outlet of the first chamber. The resonator also includes a third chamber containing an inlet and an outlet, where the inlet of the third chamber is in fluid communication with the outlet of the second chamber, and where the outlet of the third chamber is configured to be in fluid communication with a pressure relief device. The resonator also includes a fourth chamber encompassing the second chamber and in fluid communication with the second chamber by the filter port.

In other embodiments, a pressurized fluid system includes a resonator, a pressurized fluid source, and a pressure relief device. The resonator includes a first chamber containing an inlet and an outlet and a second chamber containing an inlet, an outlet, and a filter port, where the inlet of the second chamber is in fluid communication with the outlet of the first chamber. The resonator also includes a third chamber containing an inlet and an outlet, where the inlet of the third chamber is in fluid communication with the outlet of the second chamber and a fourth chamber encompassing the second chamber and in fluid communication with the second chamber by the filter port. The pressurized fluid source is located upstream of the resonator and in fluid communication with the inlet of the first chamber. The pressure relief device is located downstream of the resonator and in fluid communication with the outlet of the third chamber.

In some embodiments, a method of reducing acoustic energy, such as rapid oscillation, within a pressurized fluid system includes passing an initial acoustic energy from a pressurized fluid source to a resonator fluidly coupled downstream of the pressurized fluid source, where the initial acoustic energy has a frequency in a range from about 1 Hz to about 500 Hz. The method further includes dissipating, dampening, diminishing, or otherwise attenuating a portion of the initial acoustic energy within the resonator to produce a reduced acoustic energy and passing the reduced acoustic energy from the resonator to a pressure relief device fluidly coupled downstream of the resonator. The resonator includes a first chamber containing an inlet and an outlet, where the inlet of the first chamber is fluidly coupled to the pressurized fluid source and a second chamber containing an inlet, an outlet, and a filter port, where the inlet of the second chamber is in fluid communication with the outlet of the first chamber. The resonator also includes a third chamber containing an inlet and an outlet, where the inlet of the third chamber is in fluid communication with the outlet of the second chamber, and where the outlet of the third chamber is fluidly coupled to the pressure relief device. The resonator also includes a fourth chamber encompassing the second chamber and in fluid communication with the second chamber by the filter port. In one or more examples, the resonator is configured to dissipate, dampen, diminish, or otherwise attenuate greater than 25% of the initial acoustic energy having a frequency in a range from about 1 Hz to about 500 Hz, such as greater than 60% of the initial acoustic energy having a frequency in a range from about 25 Hz to about 300 Hz.

In one or more embodiments, a resonator for a pressurized fluid system includes a first chamber containing an inlet and an outlet, a second chamber containing an inlet and an outlet, where the inlet of the second chamber is in fluid communication with the outlet of the first chamber, and a third chamber containing an inlet and an outlet, where the inlet of the third chamber is in fluid communication with the outlet of the second chamber, and where the outlet of the third chamber is configured to be in fluid communication with a pressure relief device.

In other embodiments, a resonator for a pressurized fluid system includes a first chamber containing an inlet and an outlet and a second chamber containing an inlet and an outlet, where the inlet of the second chamber is in fluid communication with the outlet of the first chamber. The resonator also includes a third chamber containing an inlet and an outlet, where the inlet of the third chamber is in fluid communication with the outlet of the second chamber, and where the outlet of the third chamber is configured to be in fluid communication with a pressure relief device, and a baffle encompassing the second chamber and disposed between the first and third chambers.

BRIEF DESCRIPTION OF THE DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of scope, for the disclosure may admit to other equally effective implementations.

FIG. 1 depicts a schematic view of a pressurized fluid system containing a resonator, according to one or more embodiments described and discussed herein.

FIGS. 9A-9D depict schematic, cross-sectional views of other resonators, according to one or more embodiments described and discussed herein.

Figure 2A:
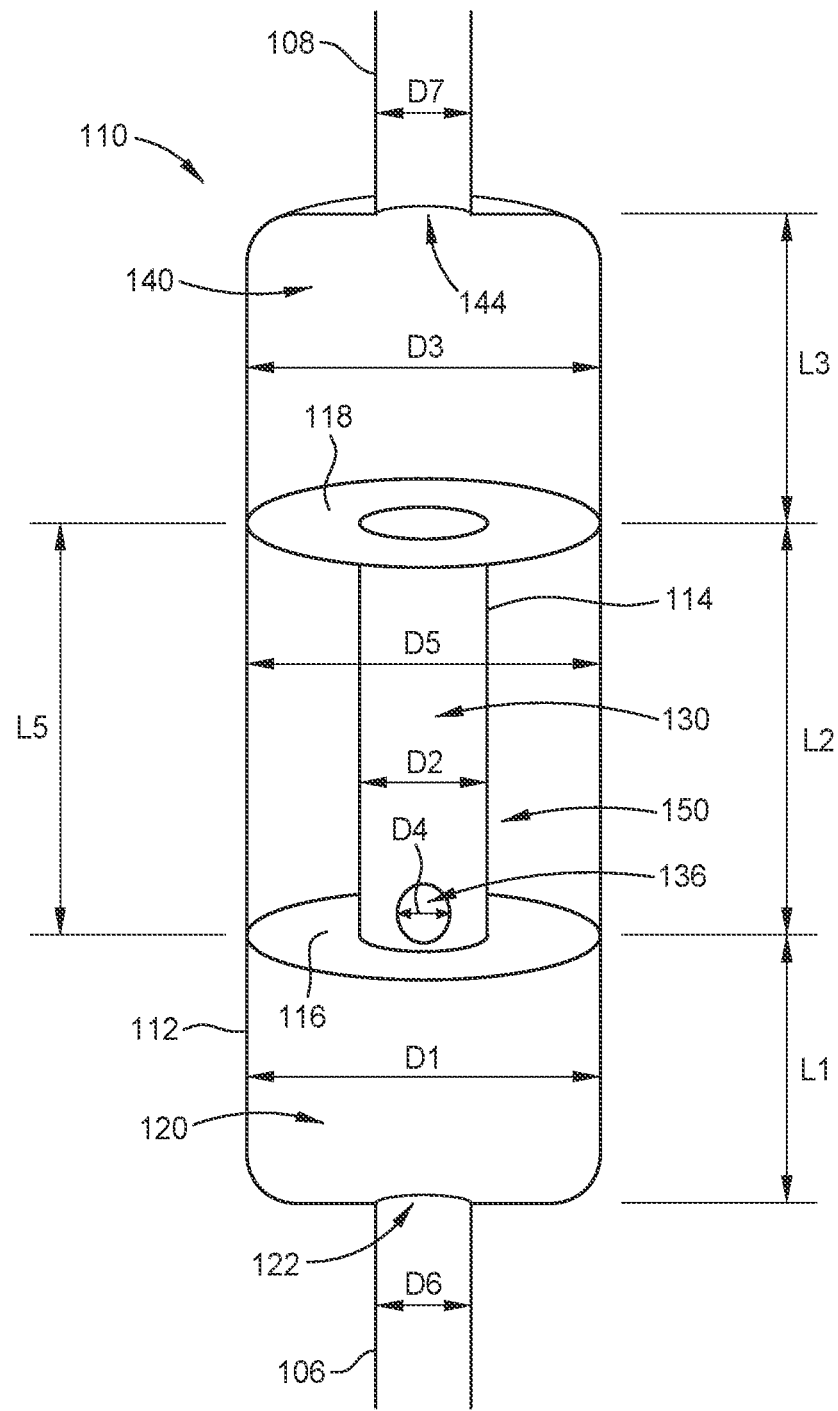
FIG. 2A depicts a schematic, perspective view of a resonator, according to one or more embodiments described and discussed herein.

To facilitate understanding, identical reference numerals have been used, where possible, to designate identical elements that are common to the Figures. It is contemplated that elements and features of one implementation may be beneficially incorporated in other implementations without further recitation.

DETAILED DESCRIPTION

Implementations described herein generally relate to resonators for pressurized fluid systems, pressurized fluid systems containing resonators, and methods for reducing acoustic energy within a pressurized fluid system. The resonator can be installed between protected equipment, such as a pressurized fluid system, and a pressurized relief device to reduce or eliminate acoustical energy generated from the use of the pressure relief device from interfering with the stable operation of the pressure relief device.

FIG. 1 depicts a schematic view of a pressurized fluid system 100 containing a resonator 110 disposed between and in fluid communication with a pressurized fluid source 102 and a pressure relief device 104, according to one or more embodiments described and discussed herein. The pressurized fluid source 102 can be or include one or more pressure vessels, one or more pressurized pipes, other equipment or components of a pressurized system, or any combination thereof. The pressurized fluid source 102 is in fluid communication with the resonator 110 via one or more conduits 106, and the resonator 110 is in fluid communication with the pressure relief device 104 via one or more conduits 108. The pressure relief device 104 can be or include one or more relief valves, such as pressure relief valve (PRV), a safety valve, a bellows relief valve, a pilot-operated relief valve, a power-actuated relief valve, an electromagnetic-actuated relief valve, a pneumatically-actuated relief valve, a spring-driven relief valve, or any combination thereof. Each of the conduits 106, 108 can independently be or include a pipe, a duct, a tube, a coupling, or other similar device.

One or more fluids flow, pass, or otherwise transfer from the pressurized fluid source 102 through the resonator 110 to the pressure relief device 104. As used herein, the term "fluid" can be or include one or more liquids, vapors, gases, supercritical, or any mixture thereof of any of these fluid phases. When the internal pressure of the pressurized fluid source 102 exceeds a pre-defined pressure setting, the pressure relief device 104 can be forced open by the internal pressure, allowing excess pressurized fluid to escape the pressure relief device 104. The excess pressurized fluid is released by the flow of the fluid from the pressurized fluid source 102 (e.g., a protected system) through the pressure relief device 104 (e.g., relief valve) and into a disposal system (e.g., a flare), into the atmosphere, or into a reservoir, vessel, or other container (not shown).

Figure 2B:
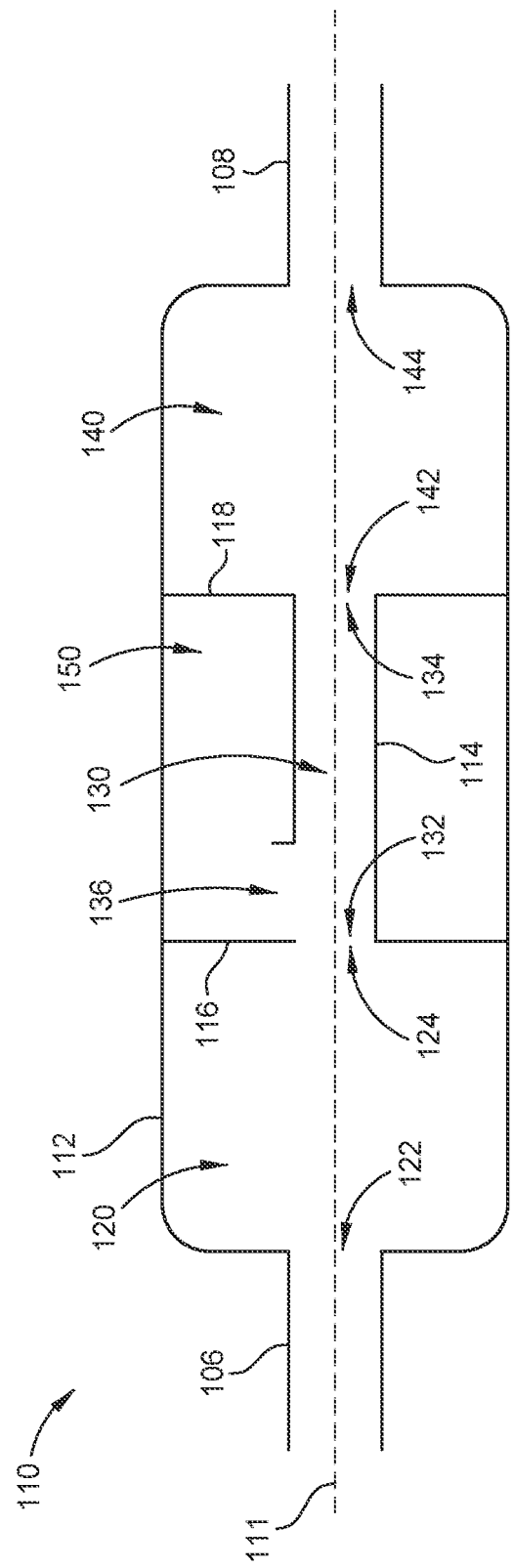
FIG. 2B depicts a schematic, cross-sectional view of the resonator shown in FIG. 2A, according to one or more embodiments described and discussed herein.

FIG. 2A depicts a schematic, perspective view of the resonator 110 and FIG. 2B depicts a schematic, cross-sectional view of the resonator 110, according to one or more embodiments described and discussed herein. The resonator 110 can be used in the pressurized fluid system 100, as well as pressurized fluid systems having different configurations and components as the pressurized fluid system 100. The resonator 110 includes a first chamber 120 containing an inlet 122 and an outlet 124 and a second chamber 130 containing an inlet 132, an outlet 134, and a filter port 136. The inlet 122 of the first chamber 120 is at least configured to be in fluid communication with and/or coupled to the pressurized fluid source 102, such as by the conduit 106 depicted in FIG. 1. The inlet 132 of the second chamber 130 is in fluid communication with the outlet 124 of the first chamber 120. The resonator 110 also includes a third chamber 140 containing an inlet 142 and an outlet 144. The inlet 142 of the third chamber 140 is in fluid communication with the outlet 134 of the second chamber 130. The outlet 144 of the third chamber 140 is at least configured to be in fluid communication with and/or coupled to the pressure relief device 104, such as by the conduit 108 depicted in FIG. 1. A fourth chamber 150 is at least partially or completely encompassing the second chamber 130 and in fluid communication with the second chamber 130 by the filter port 136.

A first baffle 116 is disposed between and separates the first and fourth chambers 120, 150 and a second baffle 118 is disposed between and separates the third and fourth chambers 140, 150. In one or more embodiments, the filter port 136 is adjacent to the first baffle 116. Although only one is shown in FIGS. 2A and 2B, one, two or more of the filter ports 136 provide a passageway for fluid to flow from the second chamber 130 and into the fourth chamber 150. In some configurations, the fourth chamber 150 is disposed between the first and third chambers 120, 140. The fourth chamber 150 is fluidly isolated from the first and third chambers 120, 140. By fluidly isolated, the fourth chamber 150 is not directly in fluid communication with the first and third chambers 120, 140, but instead, the fourth chamber 150 is in fluid communication with the first and third chambers 120, 140 via the second chamber 130 as an intermediate chamber.

In one or more embodiments, a body 112 encloses, encompasses, or otherwise contains the first, second, third, and fourth chambers 120, 130, 140, 150 and the first and second baffles 116, 118. Also, a body 114 encloses, encompasses, or otherwise contains the second chamber 130.

As depicted in FIG. 2A, the first chamber 120 has a length L1 and diameter D1, the second chamber 130 has a length L2 and diameter D2, the third chamber 140 has a length L3 and diameter D3, and the fourth chamber 150 has a length L5 and diameter D5. The filter port 136 has a diameter D4. The conduits 106 and 108 have diameters D6 and D7, respectively.

In one or more embodiments, each of the lengths L1, L2, L3, and L5 of the first, second, third, and fourth chambers 120, 130, 140, 150, respectively, can be about 2 inches, about 4 inches, about 6 inches, about 8 inches, or about 12 inches to about 15 inches, about 18 inches, about 2 feet, about 3 feet, about 4 feet, about 5 feet, about 6 feet, about 8 feet, about 10 feet, about 12 feet, or longer. For example, each of the lengths L1, L2, L3, and L5 of the first, second, third, and fourth chambers 120, 130, 140, 150, respectively, can be about 2 inches to about 10 feet, about 2 inches to about 8 feet, about 2 inches to about 6 feet, about 2 inches to about 5 feet, about 2 inches to about 4 feet, about 2 inches to about 3 feet, about 2 inches to about 2 feet, about 2 inches to about 18 inches, about 2 inches to 12 inches, about 2 inches to about 8 inches, about 2 inches to about 6 inches, about 6 inches to about 10 feet, about 6 inches to about 8 feet, about 6 inches to about 6 feet, about 6 inches to about 5 feet, about 6 inches to about 4 feet, about 6 inches to about 3 feet, about 6 inches to about 2 feet, about 6 inches to about 18 inches, about 6 inches to 16 inches, about 6 inches to about 8 inches, about 1 foot to about 10 feet, about 1 foot to about 8 feet, about 1 foot to about 6 feet, about 1 foot to about 5 feet, about 1 foot to about 4 feet, about 1 foot to about 3 feet, about 1 foot to about 2 feet, or about 1 foot to about 18 inches.

In some embodiments, the first, third, and fourth chambers 120, 140, 150 have the same diameter as each other, such that D1, D3, and D5 are equal. In other embodiments, the first, third, and fourth chambers 120, 140, 150 have different diameters as each other. Each of the diameters D1, D3, and D5 of the first, third, and fourth chambers 120, 140, 150, respectively, can independently be about 0.25 inch, about 0.375 inch, about 0.5 inch, about 0.75 inch, about 1 inch, about 1.25 inches, about 1.5 inches, about 2 inches, about 2.5 inches, or about 3 inches to about 3.5 inches, about 4 inches, about 5 inches, about 6 inches, about 8 inches, about 10 inches, about 12 inches, about 14 inches, about 15 inches, about 16 inches, about 18 inches, about 20 inches, about 22 inches, about 24 inches, about 28 inches, about 30 inches, about 32 inches, about 36 inches, about 42 inches, about 48 inches, or greater. For example, each of the diameters D1, D3, and D5 of the first, third, and fourth chambers 120, 140, 150, respectively, can independently be about 0.5 inches to about 48 inches, about 0.5 inches to about 42 inches, about 0.5 inches to about 36 inches, about 0.5 inches to about 30 inches, about 0.5 inches to about 24 inches, about 0.5 inches to about 18 inches, about 0.5 inches to about 15 inches, about 0.5 inches to about 12 inches, about 0.5 inches to about 10 inches, about 0.5 inches to about 8 inches, about 0.5 inches to about 6 inches, about 0.5 inches to about 4 inches, about 0.5 inches to about 3 inches, about 0.5 inches to about 2 inches, about 1 inch to about 48 inches, about 1 inch to about 42 inches, about 1 inch to about 36 inches, about 1 inch to about 30 inches, about 1 inch to about 24 inches, about 1 inch to about 18 inches, about 1 inch to about 15 inches, about 1 inch to about 12 inches, about 1 inch to about 10 inches, about 1 inch to about 8 inches, about 1 inch to about 6 inches, about 1 inch to about 4 inches, about 1 inch to about 3 inches, about 1 inch to about 2 inches, about 2 inches to about 48 inches, about 2 inches to about 42 inches, about 2 inches to about 36 inches, about 2 inches to about 30 inches, about 2 inches to about 24 inches, about 2 inches to about 18 inches, about 2 inch to about 15 inches, about 2 inch to about 12 inches, about 2 inch to about 10 inches, about 2 inch to about 8 inches, about 2 inch to about 6 inches, about 2 inch to about 4 inches, or about 2 inch to about 3 inches.

In one or more embodiments, as depicted in FIGS. 2A and 2B, the diameter D2 of the second chamber 130 is less than any other the diameters D1, D3, or D5 of the first, third, or fourth chamber 120, 140, 150. Each of the diameter D2 of the second chamber 130, the diameter D6 of the conduit 106, and the diameter D7 of the conduit 108 can independently be about 0.25 inch, about 0.3 inches, about 0.375 inch, about 0.5 inch, about 0.7 inches, about 0.75 inch, about 1 inch, about 1.2 inches, about 1.25 inches, about 1.5 inches, about 1.8 inches, about 2 inches, about 2.5 inches, or about 3 inches to about 3.5 inches, about 4 inches, about 5 inches, about 6 inches, about 8 inches, about 10 inches, about 12 inches, about 14 inches, about 15 inches, about 16 inches, about 18 inches, about 20 inches, about 22 inches, about 24 inches, about 28 inches, about 30 inches, about 32 inches, about 36 inches, or about 42 inches. For example, each of the diameter D2 of the second chamber 130, the diameter D6 of the conduit 106, and the diameter D7 of the conduit 108 can independently be about 0.3 inches to about 42 inches, about 0.3 inches to about 36 inches, about 0.3 inches to about 30 inches, about 0.3 inches to about 24 inches, about 0.3 inches to about 18 inches, about 0.3 inches to about 15 inches, about 0.3 inches to about 12 inches, about 0.3 inches to about 10 inches, about 0.3 inches to about 8 inches, about 0.3 inches to about 6 inches, about 0.3 inches to about 4 inches, about 0.3 inches to about 3 inches, about 0.3 inches to about 2.5 inches, about 0.3 inches to about 2 inches, about 0.3 inches to about 1.5 inches, about 0.3 inches to about 1 inch, about 0.3 inches to about 0.8 inches, about 0.3 inches to about 0.5 inches, about 1 inch to about 42 inches, about 1 inch to about 36 inches, about 1 inch to about 30 inches, about 1 inch to about 24 inches, about 1 inch to about 18 inches, about 1 inch to about 15 inches, about 1 inch to about 12 inches, about 1 inch to about 10 inches, about 1 inch to about 8 inches, about 1 inch to about 6 inches, about 1 inch to about 4 inches, about 1 inch to about 3 inches, about 1 inch to about 2.5 inches, about 1 inch to about 2 inches, about 1 inch to about 1.5 inches, about 1.5 inches to about 42 inches, about 1.5 inches to about 36 inches, about 1.5 inches to about 30 inches, about 1.5 inches to about 24 inches, about 1.5 inches to about 18 inches, about 1.5 inches to about 15 inches, about 1.5 inches to about 12 inches, about 1.5 inches to about 10 inches, about 1.5 inches to about 8 inches, about 1.5 inches to about 6 inches, about 1.5 inches to about 4 inches, about 1.5 inches to about 3 inches, about 1.5 inches to about 2.5 inches, or about 1.5 inches to about 2 inches.

The size of the filter port 136 can be made with different sizes, e.g., different sizes of diameter D4, in order to control the fluid flow from the second chamber 130 and into the fourth chamber 150 thereby adjusting the amount and/or frequencies of the acoustic energy that is removed by the resonator 100. The diameter D4 of the filter port 136 can be about 0.1 inches, about 0.2 inches, about 0.25 inches, about 0.3 inches, about 0.5 inches, or about 0.7 inches to about 0.8 inches, about 1 inch, about 1.2 inches, about 1.5 inches, about 2 inches, about 3 inches, about 4 inches, about 5 inches, about 6 inches, about 8 inches, about 10 inches, or greater. For example, the diameter D4 of the filter port 136 can be about 0.1 inches to about 10 inches, about 0.2 inches to about 10 inches, about 0.25 inches to about 10 inches, about 0.5 inches to about 10 inches, about 0.8 inches to about 10 inches, about 1 inch to about 10 inches, about 1.5 inches to about 10 inches, about 2 inches to about 10 inches, about 2.5 inches to about 10 inches, about 0.1 inches to about 6 inches, about 0.2 inches to about 6 inches, about 0.25 inches to about 6 inches, about 0.5 inches to about 6 inches, about 0.8 inches to about 6 inches, about 1 inch to about 6 inches, about 1.5 inches to about 6 inches, about 2 inches to about 6 inches, about 2.5 inches to about 6 inches, about 3 inches to about 6 inches, about 4 inches to about 6 inches, about 0.1 inches to about 3 inches, about 0.2 inches to about 3 inches, about 0.25 inches to about 3 inches, about 0.5 inches to about 3 inches, about 0.8 inches to about 3 inches, about 1 inch to about 3 inches, about 1.5 inches to about 3 inches, about 2 inches to about 3 inches, or about 2.5 inches to about 3 inches.

In one or more embodiments, the second and fourth chambers 130, 150 have the same length along a common axis, such as the axis 111 of the resonator 110, such that length L2 is equal to length L5. In other embodiments, the first, second, third, and fourth chambers 120, 130, 140, 150 are axially aligned or coaxial with each other via the axis 111 of the resonator 110, as depicted in FIG. 2B. Each of the inlets 122, 132, 142 and the outlets 124, 134, 144 of the first, second, and third chambers 120, 130, 140 can also be axially aligned or coaxial with each other via the axis 111.

Each of the first chamber 120, the second chamber 130, the third chamber 140, and the fourth chamber 150 independently contains one or more metals or one or more polymeric materials. Exemplary metals can be or include one or more of iron, steel, stainless steel (304 or 316), Inconel alloy (X-75), nickel, chromium, aluminum, titanium, copper, brass, alloys thereof, or any combination thereof. Exemplary polymeric materials can be or include one or more of polyvinyl chloride (PVC), acrylonitrile butadiene styrene (ABS), high density polyethylene (HDPE), high density polypropylene (HDPP), polytetrafluoroethylene (PTFE), or any combination thereof. In one or more embodiments, the first, third, and fourth chambers 120, 140, 150 are independently formed or produced as an integral or monolithic body or piece. For example, each of the first, third, and fourth chambers 120, 140, 150 is independently formed from a single pipe or tube. In some configurations, the first, third, and fourth chambers 120, 140, 150 can be from independent pieces that are coupled together, such as being welded, soldered, glued, flanged, clamped, threaded, fastening with fasteners (e.g., bolts, screws, or rivets), clipped, or any combination thereof. In one or more examples, the first, third, and fourth chambers 120, 140, 150 are formed from pipes or tubes which are threaded together to produce at least a portion of the body 112.

The resonator 110 can be installed in a manner consistent with the rest of the piping (e.g., the conduits 106, 108) between the pressurized fluid source 102 and the pressure relief device 104. In one or more examples, if the other components in the conduits 106, 108 between the pressurized fluid source 102 (e.g., the protected equipment) and the pressure relief device 104 are installed with metallic flanged piping then the resonator 110 can be made of a metal and have flanged connections. In other examples, if the conduits 106, 108 contain a polymeric material (e.g., PVC piping system) that uses glued socket connections, then the resonator 110 could be made of the same or different type of polymeric material that includes glued socket connections. This is similar to other piping components (e.g., isolation valves and/or threaded pipes) that are used in pressurized system piping.

Figure 3:
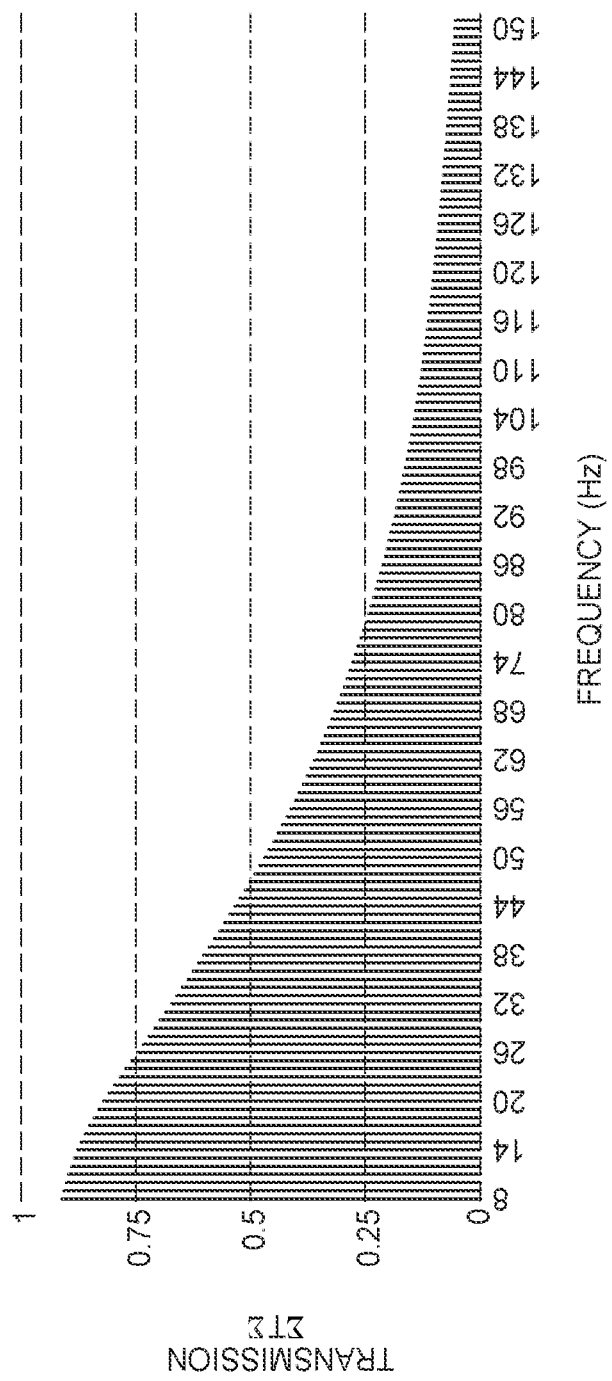
FIG. 3 is an exemplary graph plotting Transmission vs. Frequency showing a reduction of transmission energy by the resonator relative to specified frequencies, according to one or more embodiments described and discussed herein.

FIG. 3 is an exemplary graph plotting Transmission vs. Frequency showing a reduction of transmission energy by the resonator 110 relative to specified frequencies, according to one or more embodiments described and discussed herein. The resonator 110 dissipates, dampens, diminishes, reduces, or otherwise attenuates acoustic energy passing or otherwise flowing through the resonator 110. The acoustic energy is typically formed by the pressure relief device 104 and passes through the conduit 108 into the resonator 110. The resonator 110 protects the pressurized fluid source 102 (e.g., a protected system) by reducing or eliminating the acoustic energy. In some examples, the resonator 110 attenuates greater than 25%, greater than 30%, greater than 35%, greater than 40%, greater than 50%, greater than 60%, greater than 70%, greater than 75%, greater than 80%, greater than 85%, greater than 90%, greater than 92%, greater than 95%, greater than 98%, or greater than 99% of the acoustic energy. For example, the resonator 110 attenuates greater than 25% to about 99%, greater than 30% to about 99%, greater than 40% to about 99%, greater than 50% to about 99%, greater than 60% to about 99%, greater than 60% to about 98%, greater than 60% to about 95%, greater than 60% to about 90%, greater than 60% to about 88%, greater than 60% to about 85%, about 70% to about 99%, about 70% to about 98%, about 70% to about 95%, about 70% to about 90%, about 70% to about 88%, or about 70% to about 85% of the acoustic energy.

The acoustic energy can have a frequency of about 1 Hz, about 5 Hz, about 8 Hz, about 10 Hz, about 15 Hz, about 20 Hz, about 25 Hz, about 30 Hz, about 40 Hz, or about 50 Hz to about 60 Hz, about 70 Hz, about 80 Hz, about 100 Hz, about 150 Hz, about 200 Hz, about 250 Hz, about 300 Hz, about 400 Hz, or about 500 Hz. For example, the acoustic energy can have a frequency of about 1 Hz to about 500 Hz, about 1 Hz to about 400 Hz, about 1 Hz to about 300 Hz, about 1 Hz to about 250 Hz, about 1 Hz to about 200 Hz, about 1 Hz to about 150 Hz, about 1 Hz to about 100 Hz, about 1 Hz to about 80 Hz, about 1 Hz to about 50 Hz, about 1 Hz to about 30 Hz, about 25 Hz to about 500 Hz, about 25 Hz to about 400 Hz, about 25 Hz to about 300 Hz, about 25 Hz to about 200 Hz, about 25 Hz to about 100 Hz, about 30 Hz to about 500 Hz, about 30 Hz to about 400 Hz, about 30 Hz to about 300 Hz, about 30 Hz to about 250 Hz, about 30 Hz to about 200 Hz, about 30 Hz to about 150 Hz, about 30 Hz to about 100 Hz, about 30 Hz to about 80 Hz, about 30 Hz to about 50 Hz, about 30 Hz to about 30 Hz, about 50 Hz to about 500 Hz, about 50 Hz to about 400 Hz, about 50 Hz to about 300 Hz, about 50 Hz to about 250 Hz, about 50 Hz to about 200 Hz, about 50 Hz to about 150 Hz, about 50 Hz to about 100 Hz, about 50 Hz to about 80 Hz, about 100 Hz to about 500 Hz, about 100 Hz to about 400 Hz, about 100 Hz to about 300 Hz, about 100 Hz to about 250 Hz, about 100 Hz to about 200 Hz, or about 100 Hz to about 150 Hz.

In one or more examples, the resonator 110 dissipates, dampens, diminishes, reduces, or otherwise attenuates greater than 25%, greater than 40%, or greater than 50% of the acoustic energy having a frequency in a range from about 1 Hz to about 500 Hz. In some examples, the resonator 110 dissipates, dampens, diminishes, reduces, or otherwise attenuates greater than 40%, greater than 50%, or greater than 60% of an acoustic energy having a frequency in a range from about 25 Hz to about 300 Hz. In other examples, the resonator 110 dissipates, dampens, diminishes, reduces, or otherwise attenuates greater than 25%, greater than 40%, or greater than 50% of an acoustic energy having a frequency in a range from about 50 Hz to about 150 Hz. In other examples, the resonator 110 dissipates, dampens, diminishes, reduces, or otherwise attenuates greater than 75% of an acoustic energy having a frequency in a range from about 80 Hz to about 150 Hz.

In one or more embodiments, the pressurized fluid system 100 includes the resonator 110, the pressurized fluid source 102, and the pressure relief device 104. The resonator 110 includes the first chamber 120 containing the inlet 122 and the outlet 124 and the second chamber 130 containing the inlet 132, the outlet 134, and the filter port 136. The inlet 132 of the second chamber 130 is in fluid communication with the outlet 124 of the first chamber 120. The resonator 110 also includes the third chamber 140 containing the inlet 142 and the outlet 144, where the inlet 142 of the third chamber 140 is in fluid communication with the outlet 134 of the second chamber 130. Also, the fourth chamber 150 is encompassing the second chamber 130 and in fluid communication with the second chamber 130 by the filter port 136. The pressurized fluid source 102 is located upstream of the resonator 110 and in fluid communication with the inlet of the first chamber 120. The pressure relief device 104 is located downstream of the resonator 110 and in fluid communication with the outlet 144 of the third chamber 140.

In other embodiments, a method of reducing acoustic energy, such as rapid oscillation, within the pressurized fluid system 100 includes passing an initial acoustic energy from the pressurized fluid source 102 to the resonator 110 fluidly coupled downstream of the pressurized fluid source 102, where the initial acoustic energy has a frequency in a range from about 1 Hz to about 500 Hz. The method further includes dissipating, dampening, diminishing, or otherwise attenuating a portion of the initial acoustic energy within the resonator 110 to produce a reduced acoustic energy and passing the reduced acoustic energy from the resonator 110 to the pressure relief device 104 fluidly coupled downstream of the resonator 110. In one or more examples, the resonator 110 is configured to dissipate, dampen, diminish, or otherwise attenuate greater than 25% of the initial acoustic energy having a frequency in a range from about 1 Hz to about 500 Hz, such as greater than 30%, greater than 40%, greater than 50%, or greater than 60% of the initial acoustic energy having a frequency in a range from about 25 Hz to about 300 Hz.

The resonator 110 can be installed between the pressure relief device 104 and the protected equipment and prevents the acoustical energy generated from the use of the pressure relief device 104 from interfering with the stable operation of the pressure relief device 104. To function, the resonator 110 can be installed directly on the pressure relief device 104 within one wavelength of the chatter frequency from the inlet (e.g., the conduit 108) to the pressure relief device 104. The resonator 110 can work in all fluid services (e.g., vapor, two-phase, liquids, supercritical) and the resonator 110 can be installed vertically such that the inlet is directly over the outlet.

The pressure relief device 104 can be installed on new systems that are not yet constructed that require more inlet piping than allowed by codes and standards (e.g., ASME or API) in order comply with other portions of the codes (for instance the inlet lines may be required to be long in order to position the pressure relief device 104 above the disposal system such that the outlet piping drains freely).

The pressure relief device 104 works when the pressure in the system that it protects increases to the set pressure of the pressure relief device 104. When this occurs, the pressure overcomes the force holding the disk down (typically a spring), and the valve opens in the pressure relief device 104. This opening generates acoustical noise which then travels up and down the piping between the pressure relief device 104 and the protected system or pressurized fluid source 102. If the piping is long or has high inlet losses, it has been shown that relief devices and protected system begin to oscillate at specific frequencies. This oscillation is chatter. This instability is prohibited in code and can lead to structural failure of the piping and/or the pressurized fluid source 102 (e.g., protected system). The resonator 110 acoustically isolates the pressure relief device 104 from the protected equipment in the pressurized fluid source 102 but allows for the relief fluid to still pass through and protect the system from overpressure.

The resonator 110 uses a combination of chambers to isolate a broad band of acoustical energy while meeting the installation requirements of ASME codes. The size of the resonator 110 (like other piping components) varies with the size of the pressurized fluid source 102 (e.g., protected system) and the size and set pressure of the pressure relief device 104.

The outer diameter of the resonator 110 can be selected based on the overall length desired. The resonator 110 can be made from a single pipe in which case diameters D1, D3 and D5 are all identical. In some examples, if made from pressurized system piping components, both ends can be assembled by welding reducing fittings and a pipe nipple with a flanged fitting on the end. The inner chambers can be made by using flanges at baffle 118 and welding process pipe (e.g., body 114) with length L2 between baffles 116 and 118 with a cutout of diameter D4 (e.g., the filter port 136). Thus, the baffle 116 is fit snuggly in the piping (e.g., body 112) and baffle 118 is sandwiched between flanges. This insert and flanges would make the three chambers (e.g., chambers 120, 140, 150) and inner connected piping (e.g., chamber 130).

For a pressurized fluid system 100 that is suspected to have the pressure relief device 104 installation that could be unstable and requires mitigation, the first step one would need to do is to determine the frequencies at which the system may oscillate. These frequencies are bounded by the highest and lowest frequencies of the piping, the pressure relief device 104, and the vessels that are interconnected. One can determine these frequencies using the following formulas.

$$\text{Relief device} = \frac{2}{\pi}\sqrt{\frac{k}{m}},$$

where k is the spring constant and m is the moving mass of the pressure relief device 104.

$$\text{Inlet Piping} = c\sqrt{\frac{A}{V(l+1.7r)}},$$

where c is the speed of sound, A is the area of the inlet piping, V is the volume of the inlet piping and r is the radius of the inlet piping.

$$\text{Vessel} = 130{,}860 \left(\frac{L}{D}\right)^2 \sqrt{\frac{wD}{h}},$$

where L is the length of the vessel, D is the diameter of the vessel, w is the mass of the vessel, and h is the height of the vessel.

Other constraints are that none of the internal diameters of the flowing parts (D1, D2, D3, D6, and D7) can be smaller than the inlet diameter to the pressure relief device 104. Since the pressure relief device 104 oscillates at the ¼ wave, the frequency that is to be filtered out is up to or about four times those calculated in the previous equations.

For the frequency of interest, the overall transmissivity is:

$$\Pi T < 0.25$$

$$\Sigma T \Sigma = T_1 T_2 T_h T_3,$$

where, $$T_1 = \frac{2A_{InletPipe}A_{d1}}{A_{d1}(A_{InletPipe}+A_{d2})\cos(kl_1)+i(A_{InletPipe}A_{d2}+A_{d1}^2)\sin(kl_1)}$$

$$T_2 = \frac{2A_{d1}A_{d2}}{A_{d2}(A_{d1}+A_{d3})\cos(kl_2)+i(A_{d1}A_{d3}+A_{d2}^2)\sin(kl_2)}$$

$$T_3 = \frac{2A_{d2}A_{d3}}{A_{d3}(A_{d2}+A_{OutletPipe})\cos(kl_3)+i(A_{d2}A_{OutletPipe}+A_{d3}^2)\sin(kl_3)}$$

$$T_h = \frac{1}{1+\left(\frac{c/2A_{d2}}{\omega(l_4+Ed_4)/A_{d4}-c^2/\omega V_{d5}}\right)^2}$$

where, A is area, k is the wavenumber and is equal to the speed of sound divided by the angular frequency, L is length, V is volume, ω is the angular frequency, E is the end correction factor and is 0.85 for a flanged end, and c is the speed of sound. The lengths and diameters are as described and discussed for FIG. 2A.

Figure 4:
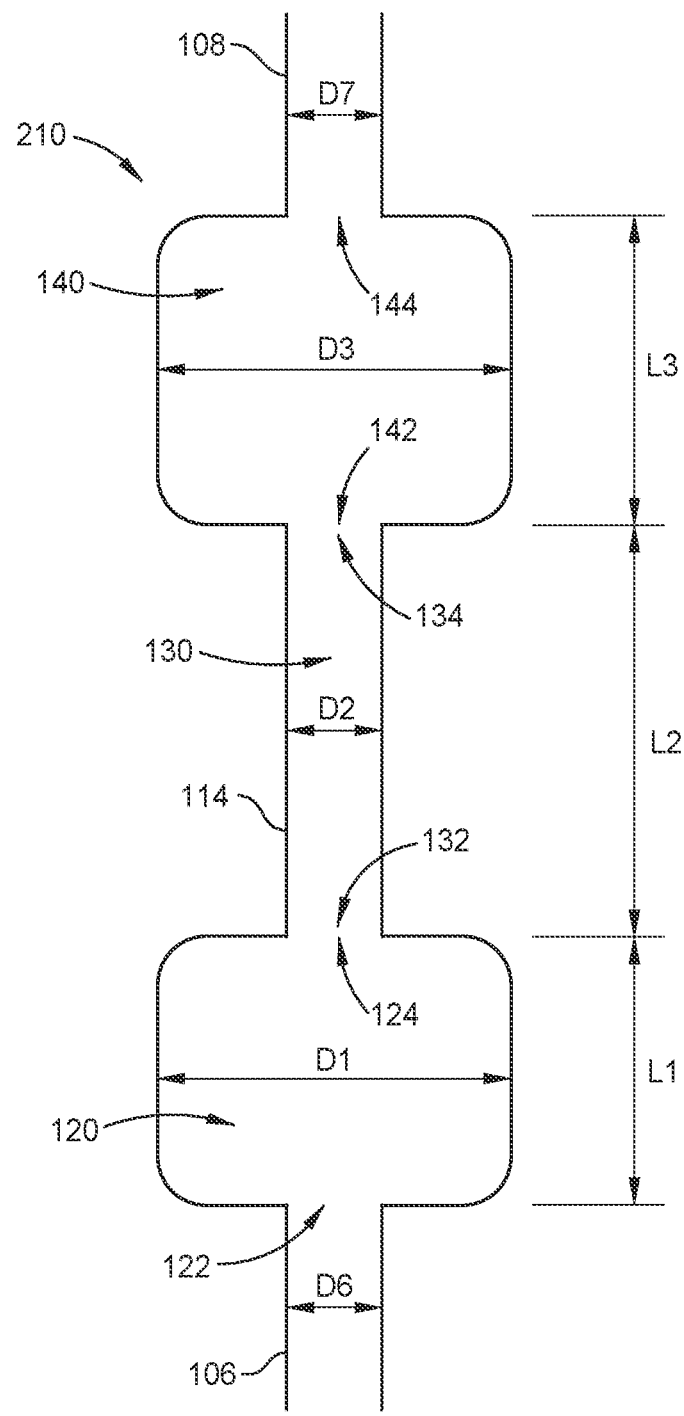
FIG. 4 depicts a schematic, cross-sectional view of another resonator, according to one or more embodiments described and discussed herein.

FIG. 4 depicts a schematic, cross-sectional view of a resonator 210, according to one or more embodiments described and discussed herein. The resonator 210 includes the first chamber 120 containing the inlet 122 and the outlet 124, the second chamber 130 containing the inlet 132 and the outlet 134, and the third chamber 140 containing the inlet 142 and the outlet 144. The inlet 132 of the second chamber 130 is in fluid communication with the outlet 124 of the first chamber 120. The inlet 142 of the third chamber 140 is in fluid communication with the outlet 134 of the second chamber 130. The outlet 144 of the third chamber 140 is configured to be in fluid communication with any pressure relief device, such as the pressure relief device 104 illustrated in FIG. 1.

In one or more embodiments for the resonator 210, the first, second, and third chambers 120, 130, 140 can be axially aligned or coaxial with each other. Also, the inlets 122, 132, 142 and the outlets 124, 134, 144 of the first, second, and third chambers 120, 130, 140 are axially aligned or coaxial with each other. In some configurations of the resonator 210, the first and third chambers 120, 140 have the same diameter as each other, and the diameter of the second chamber 130 is less than the diameter of the first or third chamber 140.

In one or more embodiments, the resonator 110 is replaced by the resonator 210 within the pressurized fluid system 100, as shown in FIG. 1. The resonator 210, contained within the pressurized fluid system 100, is located upstream of the pressurized fluid source 102. The inlet 122 of the first chamber 120 of the resonator 210 is coupled to and in fluid communication with the pressurized fluid source 102 by the conduit 106. The pressure relief device 104 is located downstream of the resonator 210. The outlet 144 of the third chamber 140 of the resonator 210 is coupled to and in fluid communication with the pressure relief device 104 by the conduit 108.

In other embodiments, a method of reducing acoustic energy within the pressurized fluid system 100 includes passing an initial acoustic energy from the pressurized fluid source 102 to the resonator 210, where the initial acoustic energy can have a frequency in a range from about 1 Hz to about 500 Hz. The method further includes attenuating a portion of the initial acoustic energy within the resonator 210 to produce a reduced acoustic energy and passing the reduced acoustic energy from the resonator 210 to a pressure relief device 104 fluidly coupled downstream of the resonator 210.

Figure 5:
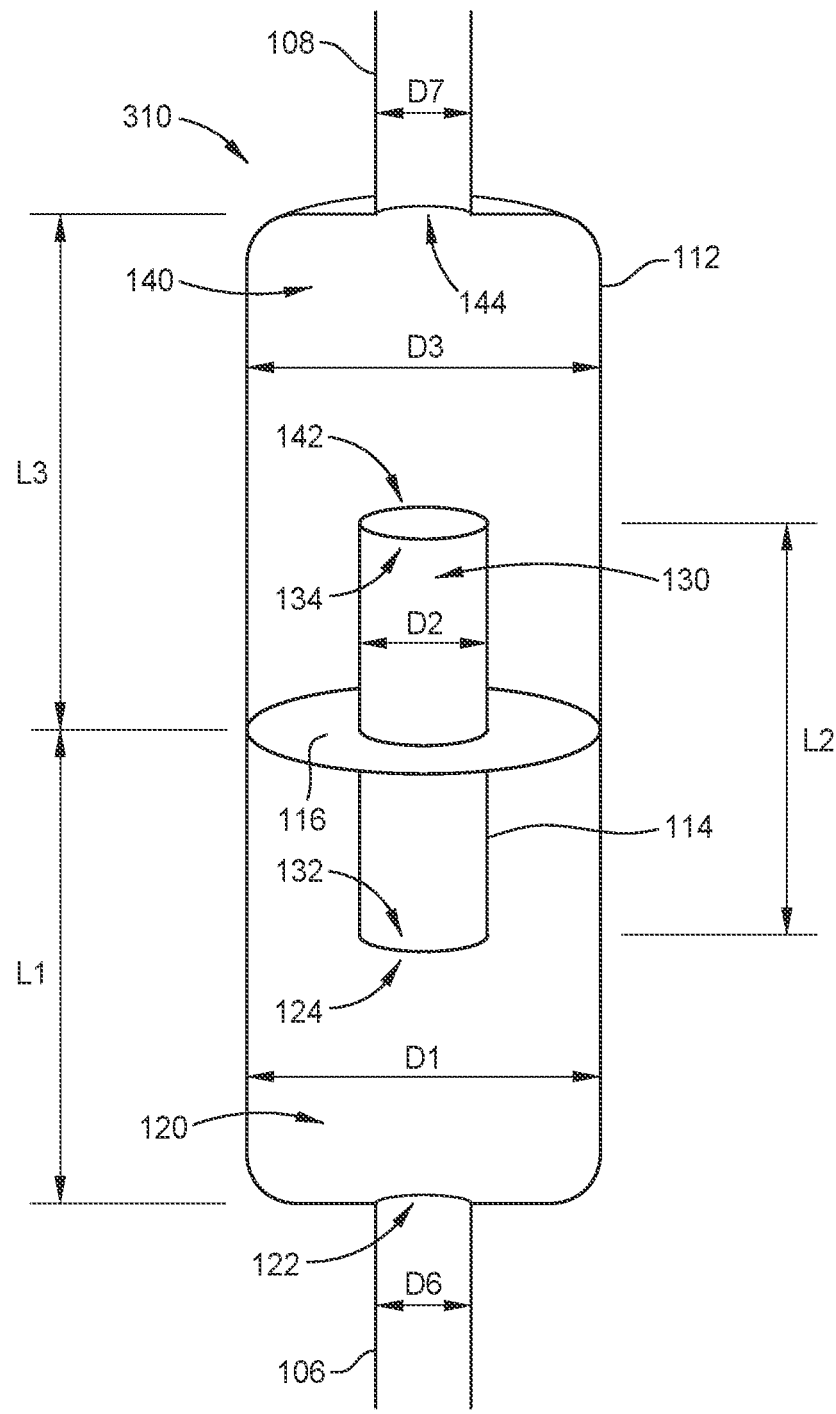
FIG. 5 depicts a schematic, cross-sectional view of another resonator, according to one or more embodiments described and discussed herein.

FIG. 5 depicts a schematic, cross-sectional view of a resonator 310, according to one or more embodiments described and discussed herein. The resonator 310 includes the first chamber 120 containing the inlet 122 and the outlet 124, the second chamber 130 containing the inlet 132 and the outlet 134, and the third chamber 140 containing the inlet 142 and the outlet 144. The inlet 132 of the second chamber 130 is in fluid communication with the outlet 124 of the first chamber 120 and the inlet 142 of the third chamber 140 is in fluid communication with the outlet 134 of the second chamber 130. The outlet 144 of the third chamber 140 is configured to be in fluid communication with any pressure relief device, such as the pressure relief device 104 illustrated in FIG. 1. The resonator 310 also includes the baffle 116 encompassing the second chamber 130 and disposed between the first and third chambers 120, 140.

In one or more embodiments, the first, second, and third chambers 120, 130, 140 are axially aligned or coaxial with each other. In some examples, the inlets and the outlets of the first, second, and third chambers 120, 130, 140 are axially aligned or coaxial with each other. In some configurations of the resonator 310, the first and third chambers 120, 140 have the same diameter as each other, and the diameter of the second chamber 130 is less than the diameter of the first or third chamber 140. In one or more examples, the first and third chambers 120, 140 are formed or produced as an integral or monolithic body or piece. For example, the first and third chambers 120, 140 are formed from a single pipe or tube.

In one or more embodiments, the resonator 110 is replaced by the resonator 310 within the pressurized fluid system 100, as shown in FIG. 1. The resonator 310, contained within the pressurized fluid system 100, is located upstream of the pressurized fluid source 102. The inlet 122 of the first chamber 120 of the resonator 310 is coupled to and in fluid communication with the pressurized fluid source 102 by the conduit 106. The pressure relief device 104 is located downstream of the resonator 310. The outlet 144 of the third chamber 140 of the resonator 310 is coupled to and in fluid communication with the pressure relief device 104 by the conduit 108.

In other embodiments, a method of reducing acoustic energy within the pressurized fluid system 100 includes passing an initial acoustic energy from the pressurized fluid source 102 to the resonator 310, where the initial acoustic energy can have a frequency in a range from about 1 Hz to about 500 Hz. The method further includes attenuating a portion of the initial acoustic energy within the resonator 310 to produce a reduced acoustic energy and passing the reduced acoustic energy from the resonator 310 to a pressure relief device 104 fluidly coupled downstream of the resonator 310.

Figure 6:
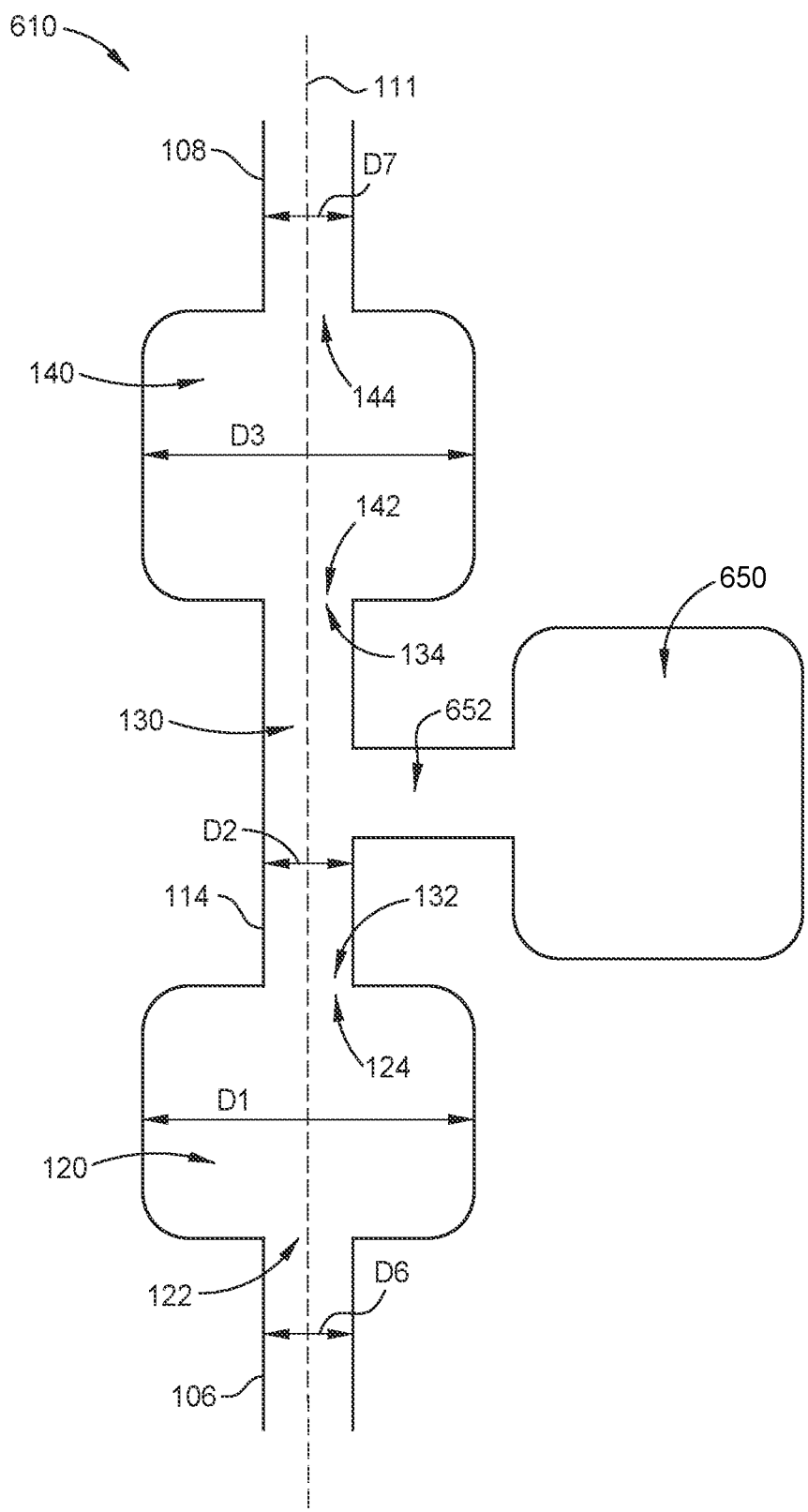
FIG. 6 depicts a schematic, cross-sectional view of another resonator, according to one or more embodiments described and discussed herein.

FIG. 6 depicts a schematic, cross-sectional view of a resonator 610, according to one or more embodiments described and discussed herein. The resonator 610 can be used in the pressurized fluid system 100 as a replacement for the resonator 110 (FIG. 1), as well as pressurized fluid systems having different configurations and components as the pressurized fluid system 100. The resonator 610 includes the first chamber 120 containing the inlet 122 and the outlet 124, the second chamber 130 containing the inlet 132 and the outlet 134, the third chamber 140 containing the inlet 142 and the outlet 144, and a chamber 650. The inlet 132 of the second chamber 130 is in fluid communication with the outlet 124 of the first chamber 120 and the inlet 142 of the third chamber 140 is in fluid communication with the outlet 134 of the second chamber 130. The outlet 144 of the third chamber 140 is configured to be in fluid communication with any pressure relief device, such as the pressure relief device 104 illustrated in FIG. 1. The chamber 650 is coupled to and in fluid communication with the second chamber 130 via a passageway 652.

In one or more embodiments for the resonator 610, the first, second, and third chambers 120, 130, 140 can be axially aligned or coaxial with each other via the axis 111. Also, the inlets 122, 132, 142 and the outlets 124, 134, 144 of the first, second, and third chambers 120, 130, 140 are axially aligned or coaxial with each other. In one or more configurations, as depicted in FIG. 6, the chamber 650 and the passageway 652 are perpendicular (90°) or substantially perpendicular to the axis 111. In other configurations, not shown, the chamber 650 and the passageway 652 are not perpendicular to the axis 111, such as positioned at an angle of about 25°, about 35°, or about 45° to about 50°, about 65°, about 75°, about 85°, or less than 90° relative to the axis 111.

In some configurations of the resonator 610, the first and third chambers 120, 140 have the same diameter as each other, and the diameter of the second chamber 130 is less than the diameter of the first or third chamber 140. In other examples, the diameter of the chamber 650 can be the same as, less than, or greater than the diameter of the first chamber 120 or the third chambers 140.

Figure 7A:
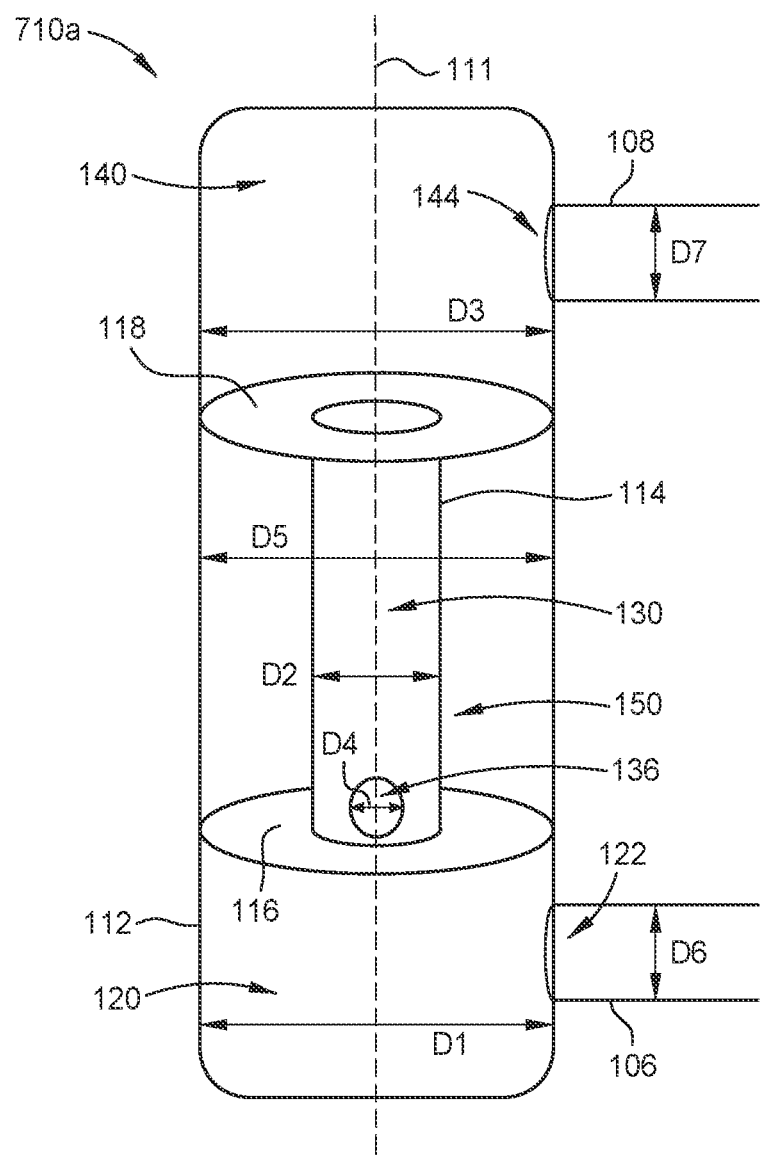
FIG. 7A depicts a schematic, cross-sectional view of another resonator, according to one or more embodiments described and discussed herein.

FIG. 7A depicts a schematic, cross-sectional view of a resonator 710a, according to one or more embodiments described and discussed herein. The resonator 710a can be used in the pressurized fluid system 100 as a replacement for the resonator 110 (FIG. 1), as well as pressurized fluid systems having different configurations and components as the pressurized fluid system 100. The resonator 710a has all of the same components, configurations, and dimensions as the resonator 110 with the exception of the location of the conduits 106, 108 relative to the body 112.

The conduit 106 and the inlet 122 are in fluid communication with the first chamber 120 but are on the side of the body 112 instead of the end of the body 112. In one or more configurations, as depicted in FIG. 7A, the conduit 106 and the inlet 122 are perpendicular (90°) or substantially perpendicular to the axis 111. The conduit 108 and the outlet 144 are in fluid communication with the third chamber 140 but are on the side of the body 112 instead of the end of the body 112. In one or more configurations, as depicted in FIG. 7A, the conduit 108 and the outlet 144 are perpendicular (90°) or substantially perpendicular to the axis 111. In other configurations, not shown, each of the conduit 106 and the conduit 108 is independently not perpendicular to the axis 111, such as positioned at an angle of about 25°, about 35°, or about 45° to about 50°, about 65°, about 75°, about 85°, or less than 90° relative to the axis 111.

Figure 7B:
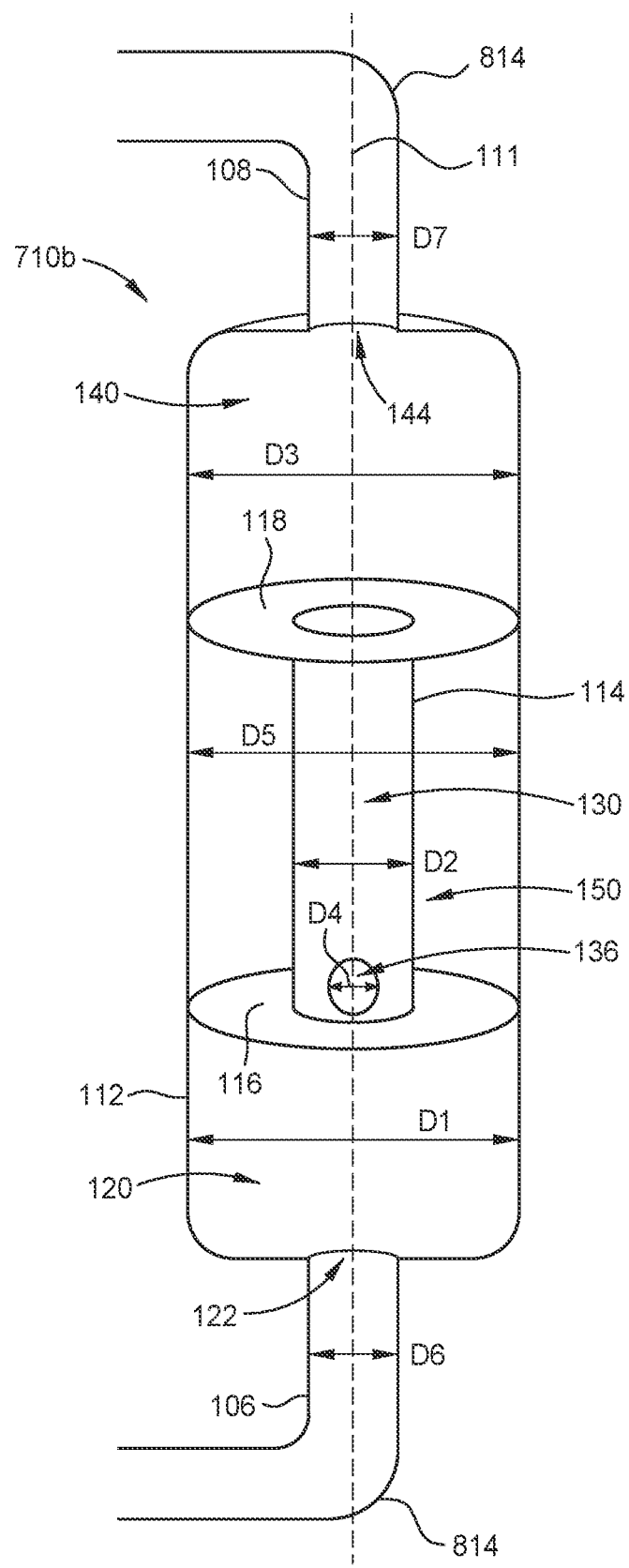
FIG. 7B depicts a schematic, cross-sectional view of another resonator, according to one or more embodiments described and discussed herein.

FIG. 7B depicts a schematic, cross-sectional view of a resonator 710b, according to one or more embodiments described and discussed herein. The resonator 710b can be used in the pressurized fluid system 100 as a replacement for the resonator 110 (FIG. 1), as well as pressurized fluid systems having different configurations and components as the pressurized fluid system 100. The resonator 710b has all of the same components, configurations, and dimensions as the resonator 110, but also includes one, two, or more elbows 814 disposed on the conduit 106 and/or the conduit 108. FIG. 7B depicts two elbows 814, one on each of the conduits 106, 108. Each of the elbows 814 can be angled perpendicular (90°) or substantially perpendicular to the axis 111, as depicted in FIG. 7B. In other configurations, not shown, each of the elbows 814 is independently not perpendicular to the axis 111, such as positioned at an angle of about 25°, about 35°, or about 45° to about 50°, about 65°, about 75°, about 85°, or less than 90° relative to the axis 111.

Figure 8A:
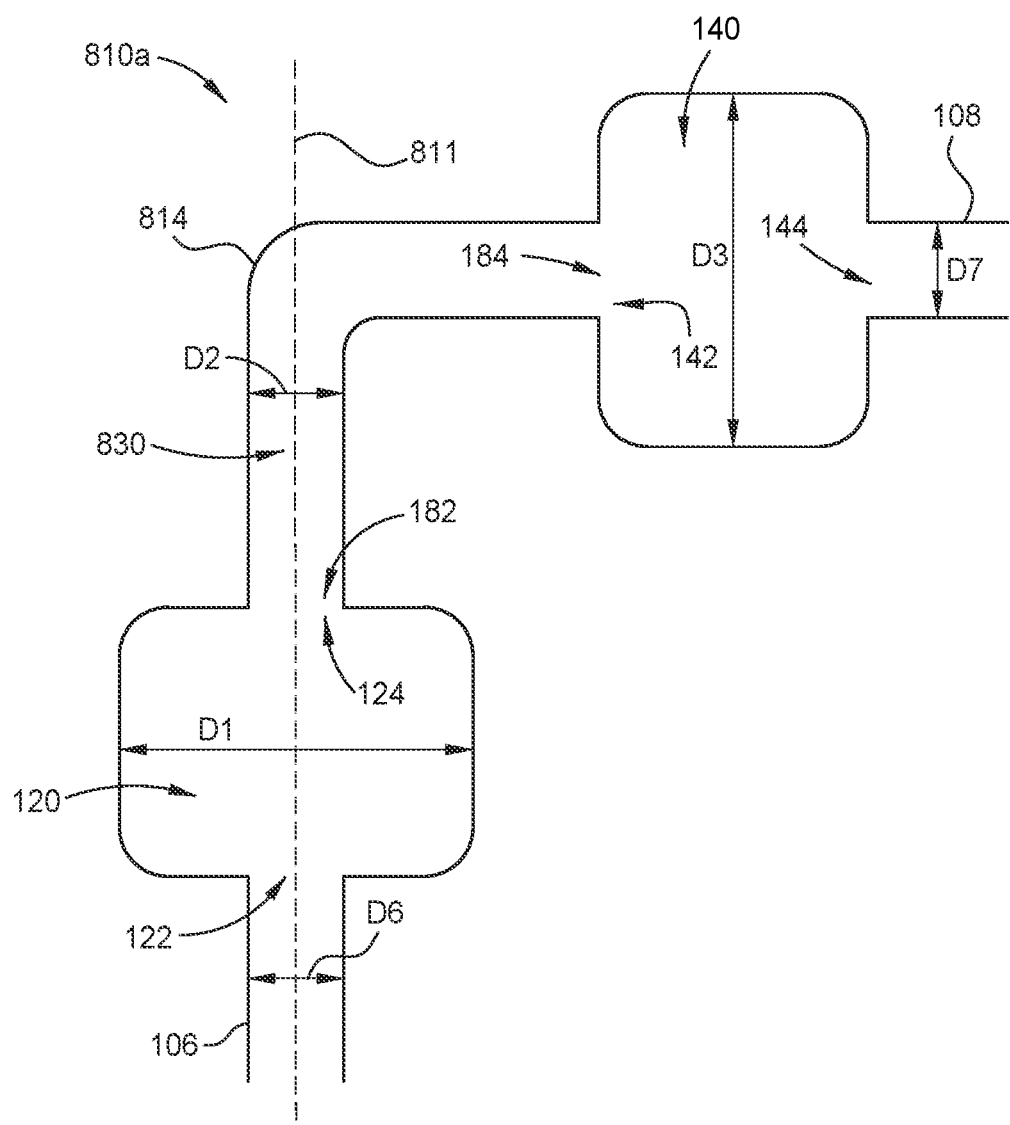
FIG. 8A depicts a schematic, cross-sectional view of another resonator, according to one or more embodiments described and discussed herein.

FIG. 8A depicts a schematic, cross-sectional view of a resonator 810a, according to one or more embodiments described and discussed herein. The resonator 810a can be used in the pressurized fluid system 100 as a replacement for the resonator 110 (FIG. 1), as well as pressurized fluid systems having different configurations and components as the pressurized fluid system 100. The resonator 810a includes the first chamber 120 containing the inlet 122 and the outlet 124, an intermediate chamber 830 containing the inlet 182 and the outlet 184, and the third chamber 140 containing the inlet 142 and the outlet 144. The inlet 182 of the intermediate chamber 830 is in fluid communication with the outlet 124 of the first chamber 120. The inlet 142 of the third chamber 140 is in fluid communication with the outlet 184 of the intermediate chamber 830. The outlet 144 of the third chamber 140 is configured to be in fluid communication with any pressure relief device, such as the pressure relief device 104 illustrated in FIG. 1.

The resonator 810a also includes one, two, or more elbows 814 disposed along the intermediate chamber 830 between the first chamber 120 and the third chamber 140. FIG. 8A depicts one elbow 814 such that the intermediate chamber 830 has one bend between the first chamber 120 and the third chamber 140. Although not shown, additional elbows 814 can be included along the intermediate chamber 830 to provide additional bends.

The elbow 814 can be angled perpendicular (90°) or substantially perpendicular to an axis 811 of the first chamber 120, as depicted in FIG. 8A. In one or more embodiments, the conduit 106, the inlets 122, 182, the first chamber 120, the outlet 124, and a portion of the intermediate chamber 830 are axially aligned or coaxial with each other via the axis 811. The conduit 108, the outlets 144, 184, the third chamber 140, the inlet 142, and another portion of the intermediate chamber 830 are axially aligned or coaxial with each other, but are angled perpendicular (90°) or substantially perpendicular to the axis 811. In other configurations, not shown, the elbow 814 is independently not perpendicular to the axis 811, as such, the conduit 108, the outlets 144, 184, the third chamber 140, the inlet 142, and a portion of the intermediate chamber 830 have the same angle and are not perpendicular (90°) to the axis 811. For example, the elbow 814 can have an angle of about 25°, about 35°, or about 45° to about 50°, about 65°, about 75°, about 85°, or less than 90° relative to the axis 811.

In one or more embodiments, the resonator 110 is replaced by the resonator 810a within the pressurized fluid system 100, as shown in FIG. 1. The resonator 810a, contained within the pressurized fluid system 100, is located upstream of the pressurized fluid source 102. The inlet 122 of the first chamber 120 of the resonator 210 is coupled to and in fluid communication with the pressurized fluid source 102 by the conduit 106. The pressure relief device 104 is located downstream of the resonator 810a. The outlet 144 of the third chamber 140 of the resonator 810a is coupled to and in fluid communication with the pressure relief device 104 by the conduit 108.

Figure 8B:
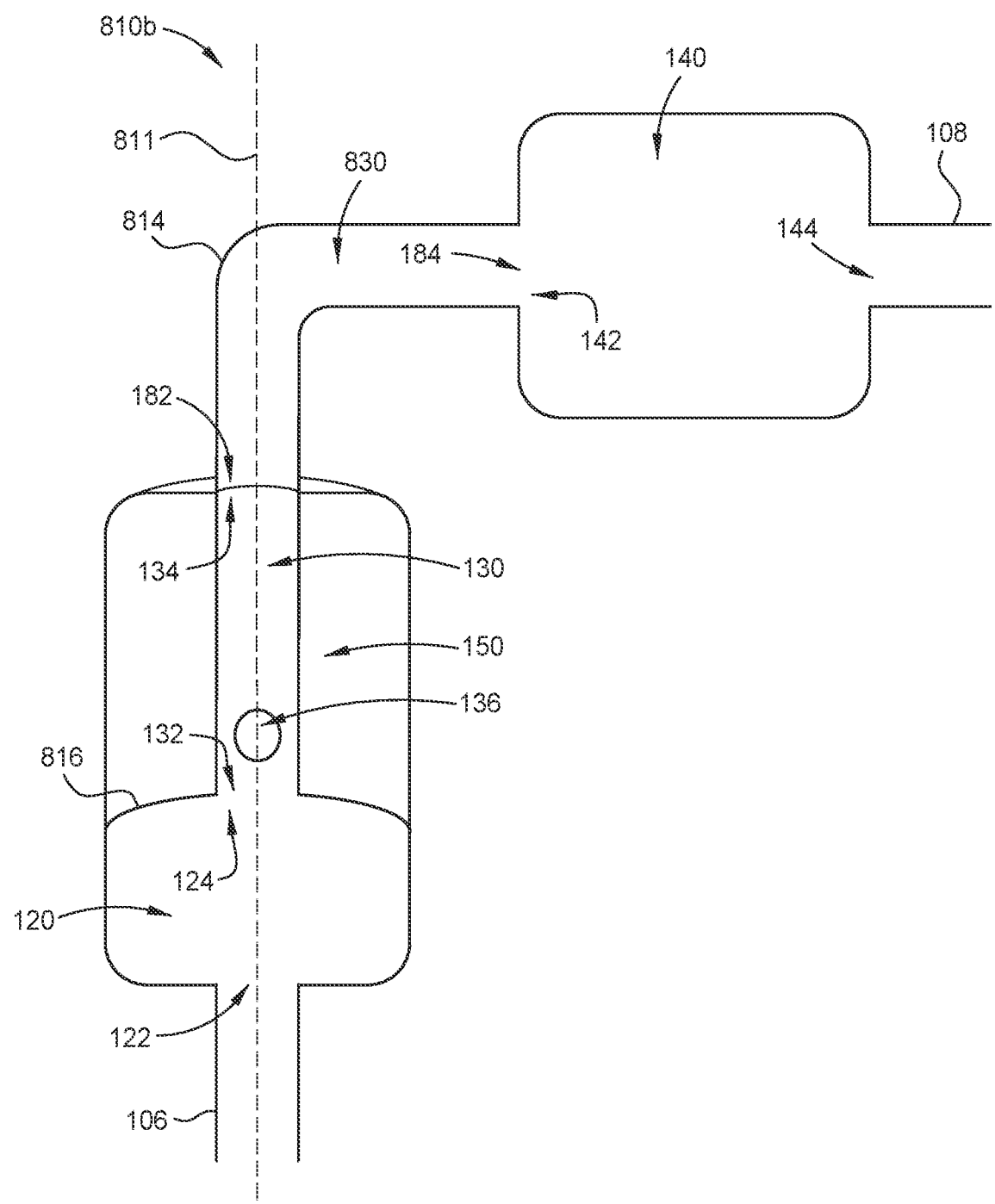
FIG. 8B depicts a schematic, cross-sectional view of another resonator, according to one or more embodiments described and discussed herein.

FIG. 8B depicts a schematic, cross-sectional view of a resonator 810b, according to one or more embodiments described and discussed herein. The resonator 810b can be used in the pressurized fluid system 100 as a replacement for the resonator 110 (FIG. 1), as well as pressurized fluid systems having different configurations and components as the pressurized fluid system 100. The resonator 810b includes the first chamber 120 containing the inlet 122 and the outlet 124, the second chamber 130 containing the inlet 132, the outlet 134, and the filter port 136, the intermediate chamber 830 containing the inlet 182 and the outlet 184, the third chamber 140 containing the inlet 142 and the outlet 144, and the fourth chamber 150 at least partially or completely encompassing the second chamber 130 and in fluid communication with the second chamber 130 by the filter port 136. A baffle 816 is disposed between and separates the first and fourth chambers 120, 150. In one or more embodiments, the filter port 136 is adjacent to the baffle 816. Although only one is shown in FIG. 8B, one, two or more of the filter ports 136 provide a passageway for fluid to flow from the second chamber 130 and into the fourth chamber 150.

The inlet 122 of the first chamber 120 is at least configured to be in fluid communication with and/or coupled to the pressurized fluid source 102, such as by the conduit 106 depicted in FIG. 1. The inlet 132 of the second chamber 130 is in fluid communication with the outlet 124 of the first chamber 120. The inlet 182 of the intermediate chamber 830 is in fluid communication with the outlet 134 of the second chamber 130. The inlet 142 of the third chamber 140 is in fluid communication with the outlet 184 of the intermediate chamber 830. The outlet 144 of the third chamber 140 is at least configured to be in fluid communication with and/or coupled to the pressure relief device 104, such as by the conduit 108 depicted in FIG. 1.

The resonator 810b also includes one, two, or more elbows 814 disposed along the intermediate chamber 830 between the first chamber 120 and the third chamber 140. FIG. 8B depicts one elbow 814 such that the intermediate chamber 830 has one bend between the first chamber 120 and the third chamber 140. Although not shown, additional elbows 814 can be included along the intermediate chamber 830 to provide additional bends.

The elbow 814 can be angled perpendicular (90°) or substantially perpendicular to an axis 811 of the first chamber 120, as depicted in FIG. 8B. In one or more embodiments, the conduit 106, the inlets 122, 132, 182, the first chamber 120, the fourth chamber 150, the outlets 124, 134, and a portion of the intermediate chamber 830 are axially aligned or coaxial with each other via the axis 811. The conduit 108, the outlets 144, 184, the third chamber 140, the inlet 142, and another portion of the intermediate chamber 830 are axially aligned or coaxial with each other, but are angled perpendicular (90°) or substantially perpendicular to the axis 811. In other configurations, not shown, the elbow 814 is independently not perpendicular to the axis 811, as such, the conduit 108, the outlets 144, 184, the third chamber 140, the inlet 142, and a portion of the intermediate chamber 830 have the same angle and are not perpendicular (90°) to the axis 811. For example, the elbow 814 can have an angle of about 25°, about 35°, or about 45° to about 50°, about 65°, about 75°, about 85°, or less than 90° relative to the axis 811.

FIGS. 9A-9D depict schematic, cross-sectional views of resonators 910a, 910b, 910c, 910d, according to one or more embodiments described and discussed herein. Each of the resonators 910a, 910b, 910c, 910d includes the conduits 106, 108 coupled to and in fluid communication with a body 912. The conduits 106, 108 can independently be coaxial or non-coaxial with the axis 911 of the body 912.

The resonator 910a, as depicted in FIG. 9A, includes the conduit 106 aligned or otherwise coaxial with the axis 911 of the body 912 and the conduit 108 misaligned or otherwise non-coaxial with the axis 911 of the body 912. The resonator 910b, as depicted in FIG. 9B, includes the conduit 106 misaligned or otherwise non-coaxial with the axis 911 of the body 912 and the conduit 108 aligned or otherwise coaxial with the axis 911 of the body 912. The resonator 910c, as depicted in FIG. 9C, includes both of the conduits 106, 108 misaligned or otherwise non-coaxial with the axis 911 of the body 912 as well as both of the conduits 106, 108 misaligned or otherwise non-coaxial with each other. The resonator 910d, as depicted in FIG. 9D, includes both of the conduits 106, 108 misaligned or otherwise non-coaxial with the axis 911 of the body 912, and the conduits 106, 108 aligned or otherwise coaxial with each other.

Each of the resonators 910a, 910b, 910c, 910d can independently be or include any of the resonators described and discussed herein, such as any of the resonators 110, 210, 310, 610, 710a, 710b, 810a, 810b. The resonators 910a, 910b, 910c, 910d can independently be used in the pressurized fluid system 100, as well as pressurized fluid systems having different configurations and components as the pressurized fluid system 100. In one or more embodiments, an inlet of the body 912 is at least configured to be in fluid communication with and/or coupled to the pressurized fluid source (e.g., the pressurized fluid source 102 depicted in FIG. 1) by the conduit 106. Similarly, an outlet of the body 912 is at least configured to be in fluid communication with and/or coupled to the pressure relief device (e.g., the pressure relief device 104 depicted in FIG. 1) by the conduit 108.

In one or more embodiments, the body 912 encloses, encompasses, or otherwise contains one, two, three, four, or more chambers (not shown) and none, one, two, three, four, or more baffles (not shown). The chambers and/or baffles contained within the body 912 can be the same or different as described and discussed herein, such as for the resonators 110, 210, 310, 610, 710a, 710b, 810a, 810b.

EXAMPLES

Example 1—A 1.5×2 'F' Pressure Relief Valve installed on a 200 gallon tank with 120 inches of 2 inch diameter inlet pipe. Based on the above discussed equations, the Relief Valve frequency is about 50 Hz, the piping frequency is about 113 Hz and the vessel frequency is about 136 Hz. Thus, the resonator can be designed to filter out about 50% of the frequencies in a range from about 50 Hz to about 136 Hz and have a minimal opening of 1.5 inches. The inlet pipe is 2 inches and the outlet pipe to the PSV is 1.5 inches.

Thus, for a resonator made with 6 inch Schedule 40 pipe (ID −6.026 inches), the overall length from End 1 to End 2 is 16 inches, with D1=D3=D5=about 6.026 inches. D2 is 1.5 inch NPS Schedule 40 pipe with an inner diameter of 1.61 inches and is 6 inches long. The opening to the second chamber (D4) is a 1 inch hole cut in the pipe near the baffle. This resonator removes more than 50% of the energy for frequencies in a range from about 50 Hz to about 150 Hz.

For the purposes of generic design, L1=2 times L3. Relief Valve inlets can range in size from 1 inch up to 8 inches. Table 1 provides the dimensions to size the device for relief device in air service with a set pressure of 150 psig for 3 different sizes of relief devices. For this table, D4 was assumed to be 1 inch and L4 was 0.5 inches. L1=2L3 and actual overall length (AOL)=L1+L2+L3.

TABLE 1

| PSV Inlet Size (in) | Design Frequency Range (assuming 6 feet of pipe) (Hz) | AOL (in) | Outer Diameter | L2 (in) |
|---|---|---|---|---|
| 1 | 60-150 | 19 | 3-inch NPS Pipe | 10 |
| 3 | 30-80 | 30 | 6-inch NPS Pipe | 15 |
| 6 | 20-50 | 44 | 10-inch NPS Pipe | 23 |

Embodiments of the present disclosure further relate to any one or more of the following paragraphs 1-84:

1. A resonator for a pressurized fluid system, comprising: a first chamber comprising an inlet and an outlet; a second chamber comprising an inlet, an outlet, and a filter port, wherein the inlet of the second chamber is in fluid communication with the outlet of the first chamber; a third chamber comprising an inlet and an outlet, wherein the inlet of the third chamber is in fluid communication with the outlet of the second chamber, and wherein the outlet of the third chamber is configured to be in fluid communication with a pressure relief device; and a fourth chamber encompassing the second chamber and in fluid communication with the second chamber by the filter port.

2. The resonator according to paragraph 1, wherein the first, second, third, and fourth chambers are axially aligned or coaxial with each other.

3. The resonator according to paragraph 1 or 2, wherein the inlets and the outlets of the first, second, and third chambers are axially aligned or coaxial with each other.

4. The resonator according to any one of paragraphs 1-3, wherein the first, third, and fourth chambers have the same diameter as each other, and the diameter of the second chamber is less than the diameter of the first, third, or fourth chamber.

5. The resonator according to any one of paragraphs 1-4, wherein the first, third, and fourth chambers are integral or monolithic.

6. The resonator according to any one of paragraphs 1-5, wherein the first, third, and fourth chambers are formed from a single pipe.

7. The resonator according to any one of paragraphs 1-6, wherein the second and fourth chambers have the same length along a common axis.

8. The resonator according to any one of paragraphs 1-7, wherein the filter port has a diameter of about 0.25 inches to about 6 inches.

9. The resonator according to any one of paragraphs 1-8, wherein the filter port has a diameter of about 0.5 inches to about 3 inches.

10. The resonator according to any one of paragraphs 1-9, wherein the resonator is configured to attenuate greater than 50% of an acoustic energy having a frequency in a range from about 1 Hz to about 500 Hz.

11. The resonator according to any one of paragraphs 1-10, wherein the resonator is configured to attenuate greater than 60% of an acoustic energy having a frequency in a range from about 25 Hz to about 300 Hz.

12. The resonator according to any one of paragraphs 1-11, wherein a first baffle is disposed between and separates the first and fourth chambers and a second baffle is disposed between and separates the third and fourth chambers.

13. The resonator according to paragraph 12, wherein the filter port is adjacent to the first baffle.

14. The resonator according to any one of paragraphs 1-13, wherein the fourth chamber is disposed between the first and third chambers, and wherein the fourth chamber is fluidly isolated from the first and third chambers.

15. The resonator according to any one of paragraphs 1-14, wherein the pressure relief device comprises a relief valve.

16. The resonator according to any one of paragraphs 1-15, wherein the pressure relief device comprises a pressure relief valve, a safety valve, a bellows relief valve, a pilot-operated relief valve, a power-actuated relief valve, an electromagnetic-actuated relief valve, a pneumatically-actuated relief valve, a spring-driven relief valve, or any combination thereof.

17. The resonator according to any one of paragraphs 1-16, wherein the inlet of the first chamber is configured to be in fluid communication with a pressurized fluid source.

18. The resonator according to paragraph 17, wherein the pressurized fluid source is a pressure vessel or a pressurized pipe.

19. The resonator according to any one of paragraphs 1-18, wherein each of the first, second, third, and fourth chambers independently comprises a metal or a polymeric material.

20. A pressurized fluid system, comprising: a resonator comprising: a first chamber comprising an inlet and an outlet; a second chamber comprising an inlet, an outlet, and a filter port, wherein the inlet of the second chamber is in fluid communication with the outlet of the first chamber; a third chamber comprising an inlet and an outlet, wherein the inlet of the third chamber is in fluid communication with the outlet of the second chamber; and a fourth chamber encompassing the second chamber and in fluid communication with the second chamber by the filter port; a pressurized fluid source located upstream of the resonator and in fluid communication with the inlet of the first chamber; and a pressure relief device located downstream of the resonator and in fluid communication with the outlet of the third chamber.

21. The pressurized fluid system according to paragraph 20, wherein the first, second, third, and fourth chambers are axially aligned or coaxial with each other.

22. The pressurized fluid system according to paragraph 20 or 21, wherein the inlets and the outlets of the first, second, and third chambers are axially aligned or coaxial with each other.

23. The pressurized fluid system according to any one of paragraphs 20-22, wherein the first, third, and fourth chambers have the same diameter as each other, and the diameter of the second chamber is less than the diameter of the first, third, or fourth chamber.

24. The pressurized fluid system according to any one of paragraphs 20-23, wherein the first, third, and fourth chambers are integral or monolithic.

25. The pressurized fluid system according to any one of paragraphs 20-24, wherein the first, third, and fourth chambers are formed from a single pipe.

26. The pressurized fluid system according to any one of paragraphs 20-25, wherein the second and fourth chambers have the same length along a common axis.

27. The pressurized fluid system according to any one of paragraphs 20-26, wherein the filter port has a diameter of about 0.25 inches to about 6 inches.

28. The pressurized fluid system according to any one of paragraphs 20-27, wherein the filter port has a diameter of about 0.5 inches to about 3 inches.

29. The pressurized fluid system according to any one of paragraphs 20-28, wherein the resonator is configured to attenuate greater than 50% of an acoustic energy having a frequency in a range from about 1 Hz to about 500 Hz.

30. The pressurized fluid system according to any one of paragraphs 20-29, wherein the resonator is configured to attenuate greater than 60% of an acoustic energy having a frequency in a range from about 25 Hz to about 300 Hz.

31. The pressurized fluid system according to any one of paragraphs 20-30, wherein a first baffle is disposed between and separates the first and fourth chambers and a second baffle is disposed between and separates the third and fourth chambers.

32. The pressurized fluid system according to paragraph 31, wherein the filter port is adjacent to the first baffle.

33. The pressurized fluid system according to any one of paragraphs 20-32, wherein the fourth chamber is disposed between the first and third chambers, and wherein the fourth chamber is fluidly isolated from the first and third chambers.

34. The pressurized fluid system according to any one of paragraphs 20-33, wherein the pressure relief device comprises a relief valve.

35. The pressurized fluid system according to any one of paragraphs 20-34, wherein the pressure relief device comprises a pressure relief valve, a safety valve, a bellows relief valve, a pilot-operated relief valve, a power-actuated relief valve, an electromagnetic-actuated relief valve, a pneumatically-actuated relief valve, a spring-driven relief valve, or any combination thereof.

36. The pressurized fluid system according to any one of paragraphs 20-35, wherein the pressurized fluid source is a pressure vessel or a pressurized pipe.

37. The pressurized fluid system according to any one of paragraphs 20-36, wherein each of the first, second, third, and fourth chambers independently comprises a metal or a polymeric material.

38. A method of reducing acoustic energy within a pressurized fluid system, comprising: passing an initial acoustic energy from a pressurized fluid source to a resonator fluidly coupled downstream of the pressurized fluid source, wherein the initial acoustic energy has a frequency in a range from about 1 Hz to about 500 Hz; attenuating a portion of the initial acoustic energy within the resonator to produce a reduced acoustic energy; and passing the reduced acoustic energy from the resonator to a pressure relief device fluidly coupled downstream of the resonator, wherein the resonator comprises: a first chamber comprising an inlet and an outlet, wherein the inlet of the first chamber is fluidly coupled to the pressurized fluid source; a second chamber comprising an inlet, an outlet, and a filter port, wherein the inlet of the second chamber is in fluid communication with the outlet of the first chamber; a third chamber comprising an inlet and an outlet, wherein the inlet of the third chamber is in fluid communication with the outlet of the second chamber, and wherein the outlet of the third chamber is fluidly coupled to the pressure relief device; and a fourth chamber encompassing the second chamber and in fluid communication with the second chamber by the filter port.

39. The method according to paragraph 38, wherein the first, second, third, and fourth chambers are axially aligned or coaxial with each other.

40. The method according to paragraph 38 or 39, wherein the inlets and the outlets of the first, second, and third chambers are axially aligned or coaxial with each other.

41. The method according to any one of paragraphs 38-40, wherein the first, third, and fourth chambers have the same diameter as each other, and the diameter of the second chamber is less than the diameter of the first, third, or fourth chamber.

42. The method according to any one of paragraphs 38-41, wherein the first, third, and fourth chambers are integral or monolithic.

43. The method according to any one of paragraphs 38-42, wherein the first, third, and fourth chambers are formed from a single pipe.

44. The method according to any one of paragraphs 38-43, wherein the second and fourth chambers have the same length along a common axis.

45. The method according to any one of paragraphs 38-44, wherein the filter port has a diameter of about 0.25 inches to about 6 inches.

46. The method according to any one of paragraphs 38-45, wherein the filter port has a diameter of about 0.5 inches to about 3 inches.

47. The method according to any one of paragraphs 38-46, wherein the resonator attenuates greater than 25% of the initial acoustic energy having a frequency in a range from about 1 Hz to about 500 Hz.

48. The method according to any one of paragraphs 38-47, wherein the resonator attenuates greater than 40% of the initial acoustic energy having a frequency in a range from about 25 Hz to about 300 Hz.

49. The method according to any one of paragraphs 38-48, wherein a first baffle is disposed between and separates the first and fourth chambers and a second baffle is disposed between and separates the third and fourth chambers.

50. The method according to paragraph 49, wherein the filter port is adjacent to the first baffle.

51. The method according to any one of paragraphs 38-50, wherein the fourth chamber is disposed between the first and third chambers, and wherein the fourth chamber is fluidly isolated from the first and third chambers.

52. The method according to any one of paragraphs 38-51, wherein the pressure relief device comprises a relief valve.

53. The method according to any one of paragraphs 38-52, wherein the pressure relief device comprises a pressure relief valve, a safety valve, a bellows relief valve, a pilot-operated relief valve, a power-actuated relief valve, an electromagnetic-actuated relief valve, a pneumatically-actuated relief valve, a spring-driven relief valve, or any combination thereof.

54. The method according to any one of paragraphs 38-53, wherein the pressurized fluid source is a pressure vessel or a pressurized pipe.

55. The method according to any one of paragraphs 38-54, wherein each of the first, second, third, and fourth chambers independently comprises a metal or a polymeric material.

56. A resonator for a pressurized fluid system, comprising: a first chamber comprising an inlet and an outlet; a second chamber comprising an inlet and an outlet, wherein the inlet of the second chamber is in fluid communication with the outlet of the first chamber; and a third chamber comprising an inlet and an outlet, wherein the inlet of the third chamber is in fluid communication with the outlet of the second chamber, and wherein the outlet of the third chamber is configured to be in fluid communication with a pressure relief device.

57. The resonator according to paragraph 56, wherein the first, second, and third chambers are axially aligned or coaxial with each other.

58. The resonator according to paragraph 56 or 57, wherein the inlets and the outlets of the first, second, and third chambers are axially aligned or coaxial with each other.

59. The resonator according to any one of paragraphs 56-58, wherein the first and third chambers have the same diameter as each other, and the diameter of the second chamber is less than the diameter of the first or third chamber.

60. The resonator according to any one of paragraphs 56-59, wherein the resonator is configured to attenuate greater than 50% of an acoustic energy having a frequency in a range from about 1 Hz to about 500 Hz.

61. The resonator according to any one of paragraphs 56-60, wherein the resonator is configured to attenuate greater than 60% of an acoustic energy having a frequency in a range from about 25 Hz to about 300 Hz.

62. The resonator according to any one of paragraphs 56-61, wherein the pressure relief device comprises a relief valve.

63. The resonator according to any one of paragraphs 56-62, wherein the pressure relief device comprises a pressure relief valve, a safety valve, a bellows relief valve, a pilot-operated relief valve, a power-actuated relief valve, an electromagnetic-actuated relief valve, a pneumatically-actuated relief valve, a spring-driven relief valve, or any combination thereof.

64. The resonator according to any one of paragraphs 56-63, wherein the inlet of the first chamber is configured to be in fluid communication with a pressurized fluid source.

65. The resonator according to paragraph 64, wherein the pressurized fluid source is a pressure vessel or a pressurized pipe.

66. The resonator according to any one of paragraphs 56-65, wherein each of the first, second, and third chambers independently comprises a metal or a polymeric material.

67. A pressurized fluid system, comprising: the resonator according to any one of paragraphs 56-66; the pressurized fluid source located upstream of the resonator and in fluid communication with the inlet of the first chamber; and a pressure relief device located downstream of the resonator and in fluid communication with the outlet of the third chamber.

68. A method of reducing acoustic energy within a pressurized fluid system, comprising: passing an initial acoustic energy from the pressurized fluid source to the resonator according to any one of paragraphs 56-66 and fluidly coupled downstream of the pressurized fluid source, wherein the initial acoustic energy has a frequency in a range from about 1 Hz to about 500 Hz; attenuating a portion of the initial acoustic energy within the resonator to produce a reduced acoustic energy; and passing the reduced acoustic energy from the resonator to a pressure relief device fluidly coupled downstream of the resonator.

69. A resonator for a pressurized fluid system, comprising: a first chamber comprising an inlet and an outlet; a second chamber comprising an inlet and an outlet, wherein the inlet of the second chamber is in fluid communication with the outlet of the first chamber; a third chamber comprising an inlet and an outlet, wherein the inlet of the third chamber is in fluid communication with the outlet of the second chamber, and wherein the outlet of the third chamber is configured to be in fluid communication with a pressure relief device; and a baffle encompassing the second chamber and disposed between the first and third chambers.

70. The resonator according to paragraph 69, wherein the first, second, and third chambers are axially aligned or coaxial with each other.

71. The resonator according to paragraph 69 or 70, wherein the inlets and the outlets of the first, second, and third chambers are axially aligned or coaxial with each other.

72. The resonator according to any one of paragraphs 69-71, wherein the first and third chambers have the same diameter as each other, and the diameter of the second chamber is less than the diameter of the first or third chamber.

73. The resonator according to any one of paragraphs 69-72, wherein the first and third chambers are integral or monolithic.

74. The resonator according to any one of paragraphs 69-73, wherein the first and third chambers are formed from a single pipe.

75. The resonator according to any one of paragraphs 69-74, wherein the resonator is configured to attenuate greater than 25% of an acoustic energy having a frequency in a range from about 1 Hz to about 500 Hz.

76. The resonator according to any one of paragraphs 69-75, wherein the resonator is configured to attenuate greater than 40% of an acoustic energy having a frequency in a range from about 25 Hz to about 300 Hz.

77. The resonator according to any one of paragraphs 69-76, wherein the pressure relief device comprises a relief valve.

78. The resonator according to any one of paragraphs 69-77, wherein the pressure relief device comprises a pressure relief valve, a safety valve, a bellows relief valve, a pilot-operated relief valve, a power-actuated relief valve, an electromagnetic-actuated relief valve, a pneumatically-actuated relief valve, a spring-driven relief valve, or any combination thereof.

79. The resonator according to any one of paragraphs 69-78, wherein the inlet of the first chamber is configured to be in fluid communication with a pressurized fluid source.

80. The resonator according to paragraph 79, wherein the pressurized fluid source is a pressure vessel or a pressurized pipe.

81. The resonator according to any one of paragraphs 69-80, wherein each of the first, second, and third chambers independently comprises a metal or a polymeric material.

82. A pressurized fluid system, comprising: the resonator according to any one of paragraphs 69-81; the pressurized fluid source located upstream of the resonator and in fluid communication with the inlet of the first chamber; and a pressure relief device located downstream of the resonator and in fluid communication with the outlet of the third chamber.

83. A method of reducing acoustic energy within a pressurized fluid system, comprising: passing an initial acoustic energy from the pressurized fluid source to the resonator according to any one of paragraphs 69-83 and fluidly coupled downstream of the pressurized fluid source, wherein the initial acoustic energy has a frequency in a range from about 1 Hz to about 500 Hz; attenuating a portion of the initial acoustic energy within the resonator to produce a reduced acoustic energy; and passing the reduced acoustic energy from the resonator to a pressure relief device fluidly coupled downstream of the resonator.

84. The resonator, the pressurized fluid system, and/or the method according to any one of paragraphs 1-83 in combination with any of the resonator, the pressurized fluid system, and/or the method according to any one of paragraphs 1-83.

While the foregoing is directed to embodiments of the disclosure, other and further embodiments may be devised without departing from the basic scope thereof, and the scope thereof is determined by the claims that follow. All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, whenever a composition, an element, or a group of elements is preceded with the transitional phrase "comprising", it is understood that the same composition or group of elements with transitional phrases "consisting essentially of", "consisting of", "selected from the group of consisting of", or "is" preceding the recitation of the composition, element, or elements and vice versa, are contemplated.

Certain embodiments and features have been described using a set of numerical minimum values and a set of numerical maximum values. It should be appreciated that ranges including the combination of any two values, e.g., the combination of any minimum value with any maximum value, the combination of any two minimum values, and/or the combination of any two maximum values are contemplated unless otherwise indicated. Certain minimum values, maximum values, and ranges appear in one or more claims below.

What is claimed is:

1. A resonator for a pressurized fluid system, comprising:
   a first chamber comprising an inlet and an outlet;
   a second chamber comprising an inlet, an outlet, and a passageway, wherein the inlet of the second chamber is in fluid communication with the outlet of the first chamber;
   a third chamber comprising an inlet and an outlet, wherein the inlet of the third chamber is in fluid communication with the outlet of the second chamber, and wherein the outlet of the third chamber is configured to be in fluid communication with a pressure relief device comprising a safety valve; and
   a fourth chamber in fluid communication with the second chamber by the passageway;
   wherein the resonator is configured to attenuate greater than 70% of an acoustic energy having a frequency in a range from about 1 Hz to about 500 Hz.

2. The resonator of claim 1, wherein the first, second, and third chambers be are axially aligned with each other via a common axis.

3. The resonator of claim 2, wherein each of the passageway or the fourth chamber is independently perpendicular or substantially perpendicular to the common axis.

4. The resonator of claim 2, wherein each of the passageway or the fourth chamber is independently positioned at an angle in a range from about 25° to less than 90° relative to the common axis.

5. The resonator of claim 1, wherein the first and third chambers have the same diameter as each other, and the diameter of the second chamber is less than the diameter of the first or third chamber.

6. The resonator of claim 1, wherein the first, third, and fourth chambers are integral or monolithic.

7. The resonator of claim 1, wherein the resonator is configured to attenuate greater than 75% of an acoustic energy having a frequency in a range from about 25 Hz to about 400 Hz.

8. The resonator of claim 1, wherein the pressure relief device further comprises a pressure relief valve, a bellows relief valve, a pilot-operated relief valve, a power-actuated relief valve, an electromagnetic-actuated relief valve, a pneumatically-actuated relief valve, a spring-driven relief valve, or any combination thereof.

9. The resonator of claim 1, wherein the inlet of the first chamber is configured to be in fluid communication with a pressurized fluid source.

10. A resonator for a pressurized fluid system, comprising:
    a first chamber comprising an inlet and an outlet;
    a second chamber comprising an inlet, an outlet, and a filter port, wherein the inlet of the second chamber is in fluid communication with the outlet of the first chamber;
    a third chamber comprising an inlet and an outlet, wherein the inlet of the third chamber is in fluid communication with the outlet of the second chamber, and wherein the outlet of the third chamber is configured to be in fluid communication with a pressure relief device comprising a safety valve; and
    a fourth chamber encompassing the second chamber and in fluid communication with the second chamber by the filter port;
    wherein the resonator is configured to attenuate greater than 50% of an acoustic energy having a frequency in a range from about 1 Hz to about 500 Hz.

11. The resonator of claim 10, further comprising an intermediate chamber comprising an inlet and an outlet, wherein the inlet of the intermediate chamber is in fluid communication with the outlet of the second chamber, and the outlet of the intermediate chamber is in fluid communication with the inlet of the third chamber.

12. The resonator of claim 11, wherein the first, second, and fourth chambers are axially aligned with each other via a common axis.

13. The resonator of claim 12, wherein the intermediate chamber comprises an elbow disposed between a first portion and a second portion, and wherein the first portion of the intermediate chamber is axially aligned with the common axis.

14. The resonator of claim 13, wherein the second portion of the intermediate chamber is perpendicular or substantially perpendicular to the common axis.

15. The resonator of claim 13, wherein the second portion of the intermediate chamber is positioned at an angle in a range from about 25° to less than 90° relative to the common axis.

16. The resonator of claim 10, further comprising a baffle disposed between and separating the first and fourth chambers, wherein the filter port is adjacent to the baffle.

17. The resonator of claim 10, wherein the filter port has a diameter of about 0.25 inches to about 8 inches.

18. A resonator for a pressurized fluid system, comprising:
a first chamber having an axis and comprising an inlet and an outlet;
an intermediate chamber comprising an inlet and an outlet, wherein the inlet of the intermediate chamber is in fluid communication with the outlet of the first chamber;
a third chamber comprising an inlet and an outlet, wherein the inlet of the third chamber is in fluid communication with the outlet of the intermediate chamber, and wherein the outlet of the third chamber is configured to be in fluid communication with a pressure relief device comprising a safety valve;
wherein the intermediate chamber comprises an elbow disposed between a first portion and a second portion, and wherein the first portion of the intermediate chamber is axially aligned with the axis; and
wherein the resonator is configured to attenuate greater than 50% of an acoustic energy having a frequency in a range from about 1 Hz to about 500 Hz.

19. The resonator of claim 18, wherein the second portion of the intermediate chamber is perpendicular or substantially perpendicular to the axis.

20. The resonator of claim 18, wherein the second portion of the intermediate chamber is positioned at an angle in a range from about 25° to less than 90° relative to the axis.

21. A resonator for a pressurized fluid system, comprising:
a first chamber having comprising an inlet and an outlet;
a second chamber comprising an inlet and an outlet, wherein the inlet of the second chamber is in fluid communication with the outlet of the first chamber;
a third chamber comprising an inlet and an outlet, wherein the inlet of the third chamber is in fluid communication with the outlet of the second chamber, and wherein the outlet of the third chamber is configured to be in fluid communication with a pressure relief device comprising a safety valve;
wherein the first, second, and third chambers be are axially aligned with each other via a common axis; and
wherein the resonator is configured to attenuate greater than 50% of an acoustic energy having a frequency in a range from about 1 Hz to about 500 Hz.

22. The resonator of claim 21, further comprising a baffle disposed between and separating the first and third chambers.

23. The resonator of claim 22, wherein the second chamber comprises a first portion and a second portion, and wherein the first portion of the second chamber is encompassed by the first chamber and the second portion of the second chamber is encompassed by the third chamber.

* * * * *